US012574507B2

(12) United States Patent
Wang et al.

(10) Patent No.: US 12,574,507 B2
(45) Date of Patent: Mar. 10, 2026

(54) INTRA PREDICTION FUSION WITH REDUCED COMPLEXITY IN VIDEO CODING

(71) Applicant: QUALCOMM Incorporated, San Diego, CA (US)

(72) Inventors: Hongtao Wang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 161 days.

(21) Appl. No.: 18/461,255

(22) Filed: Sep. 5, 2023

(65) Prior Publication Data

US 2024/0098257 A1       Mar. 21, 2024

Related U.S. Application Data

(60) Provisional application No. 63/382,961, filed on Nov. 9, 2022, provisional application No. 63/377,677, filed on Sep. 29, 2022, provisional application No. 63/375,163, filed on Sep. 9, 2022.

(51) Int. Cl.
| | |
|---|---|
| *H04N 19/11* | (2014.01) |
| *H04N 19/176* | (2014.01) |
| *H04N 19/593* | (2014.01) |

(52) U.S. Cl.
CPC ........... *H04N 19/11* (2014.11); *H04N 19/176* (2014.11); *H04N 19/593* (2014.11)

(58) Field of Classification Search
None
See application file for complete search history.

(56) References Cited

U.S. PATENT DOCUMENTS

| | | | | |
|---|---|---|---|---|
| 9,531,990 | B1 * | 12/2016 | Wilkins | ............... H04N 19/105 |
| 2023/0108480 | A1 * | 4/2023 | Li | ......................... H04N 19/593 |
| | | | | 375/240.02 |
| 2023/0300325 | A1 * | 9/2023 | Ahn | ..................... H04N 19/105 |
| | | | | 375/240.12 |
| 2024/0022732 | A1 * | 1/2024 | Chen | .................... H04N 19/176 |
| 2024/0137529 | A1 * | 4/2024 | Wang | ................... H04N 19/105 |

(Continued)

OTHER PUBLICATIONS

Abdoli M., et al., "Non-CE3: Decoder-Side Intra Mode Derivation with Prediction Fusion Using Planar," JVET-O0449-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.

(Continued)

*Primary Examiner* — Chikaodili E Anyikire

(74) *Attorney, Agent, or Firm* — Shumaker & Sieffert, P.A.

(57) ABSTRACT

A video decoder may be configured to determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; generate a fusion of predictors from the first set of intra prediction predictors and the second set of intra prediction predictors; and decode the block of video data using the fusion of predictors.

34 Claims, 12 Drawing Sheets

(56)                    References Cited

U.S. PATENT DOCUMENTS

2024/0298007 A1*   9/2024   Jhu ...................... H04N 19/119
2025/0030846 A1*   1/2025   Drugeon ............... H04N 19/159

OTHER PUBLICATIONS

Cao K., et al., "Non-EE2: Intra Prediction Fusion," JVET-AA0137-v2, Joint Video Experts Team (JVET) of ITU-T SG 16 WP 3 and ISO/IEC JEC 1/SC 29, 27th Meeting, by teleconference, Jul. 13-22, 2022, pp. 1-3.

Chen J., et al., "Algorithm Description for Versatile Video Coding and Test Model 11 (VTM 11)," JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Coban M., et al., "Algorithm Description of Enhanced Compression Model 5 (ECM 5)," JVET-Z2025, Joint Video Experts Team (JVET) of ITU-T SG 16 WP 3 and ISO/IEC JTC 1/SC 29, 26th Meeting, by Teleconference, Apr. 20-29, 2022, pp. 1-45.

Coban M., et al., "Algorithm Description of Enhanced Compression Model 6 (ECM 6)," JVET-AA2025, Joint Video Experts Team (JVET) of Itu-T Sg 16 WP 3 and ISO/IEC JTC 1/SC 29, 27th Meeting, by teleconference, Jul. 13-22, 2022, Motion Picture Expert Group or ISO/IEC JTC1/SC29/WG11, No. m60618, Oct. 11, 2022, pp. 1-54.

Coban M., et al., "Algorithm Description of Enhanced Compression Model 7 (ECM 7)," JVET-AB2025, Joint Video Experts Team (JVET) of ITU-T SG 16 WP 3 and ISO/IEC JTC 1/SC 29, 28th Meeting, Mainz, DE, Oct. 20-28, 2022, pp. 1-63.

Co-pending U.S. Appl. No. 18/339,302, inventor Cao; Keming, filed on Jun. 22, 2023.

International Search Report and Written Opinion—PCT/US2023/032098—ISA/EPO—Nov. 28, 2023.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Seregin V., et al., "Exploration Experiment on Enhanced Compression beyond VVC Capability (EE2)," JVET-AA2024-v1, Joint Video Experts Team (JVET) of ITU-T SG 16 WP 3 and ISO/IEC JTC 1/SC 29 27th Meeting, By teleconference, Jul. 13-22, 2022, pp. 1-13.

Wang F., et al., "EE2-1.4a Related: Modifications of Spatial GPM," JVET-AA0119-v2, Joint Video Experts Team (JVET) of ITU-T SG 16 WP 3 and ISO/IEC JTC 1/SC 29, 27th Meeting, by Teleconference, Jul. 13-22, 2022, pp. 1-4.

Wang F., et al., "EE2-1.6: Combination of Spatial GPM Tests," JVET-AB0155-v2, Joint Video Experts Team (JVET) of ITU-T SG 16 WP 3 and ISO/IEC JTC 1/SC 29, 28th Meeting, Mainz, DE, Oct. 20-28, 2022, pp. 1-4.

Wang H., et al., "EE2-1.11: Intra Prediction Fusion," JVET-AB0148-v2, Joint Video Experts Team (JVET) of ITU-T SG 16 WP 3 and ISO/IEC JTC 1/SC 29, 28th Meeting, Mainz, DE, Oct. 20-28, 2022, pp. 1-3.

Xu L., et al., "EE2-1.12: Combination of EE2-1.10 and EE2-1.11," JVET-AB0157-v2, Joint Video Experts Team (JVET) of ITU-T SG 16 WP 3 and ISO/IEC JTC 1/SC 29, 28th Meeting, Mainz, DE, Oct. 20-28, 2022, pp. 1-5.

Xu L., et al., "Non-EE2: Combination of JVET-AA0120 and JVET-AA0137," JVET-AA0246-v1, Joint Video Experts Team (JVET) of ITU-T SG 16 WP 3 and ISO/IEC JTC 1/SC 29, 27th Meeting, by Teleconference, Jul. 13-22, 2022, pp. 1-4.

Xu L., et al., "Non-EE2: Template-Based Multiple Reference Line Intra Prediction," JVET-AA0120-v3, Joint Video Experts Team (JVET) of ITU-T SG 16 WP 3 and ISO/IEC JTC 1/SC 29, 27th Meeting, by Teleconference, Jul. 13-22, 2022, pp. 1-5.

Zhang L., et al., "EE2-1.11: Intra Template Matching Prediction Fusion," JVET-AD0072-v2, Joint Video Experts Team (JVET) of ITU-T SG 16 WP 3 and ISO/IEC JTC 1/SC 29, 30th Meeting, Antalya, TR, Apr. 21-28, 2023, pp. 1-5.

Zhang L., et al., "Non-EE2: Intra Template-Matching Prediction Fusion," JVET-AC0069-v2, Joint Video Experts Team (JVET) of ITU-T SG 16 WP 3 and ISO/IEC JTC 1/SC 29, 29th Meeting, by Teleconference, Jan. 11-20, 2023, pp. 1-5.

* cited by examiner

172 ——————————————▶ INTEGER SLOPE

174 ■-■-■-■-■-■-■-■-■-▶ NON INTEGER SLOPE

■     REFERENCE SAMPLES
       170

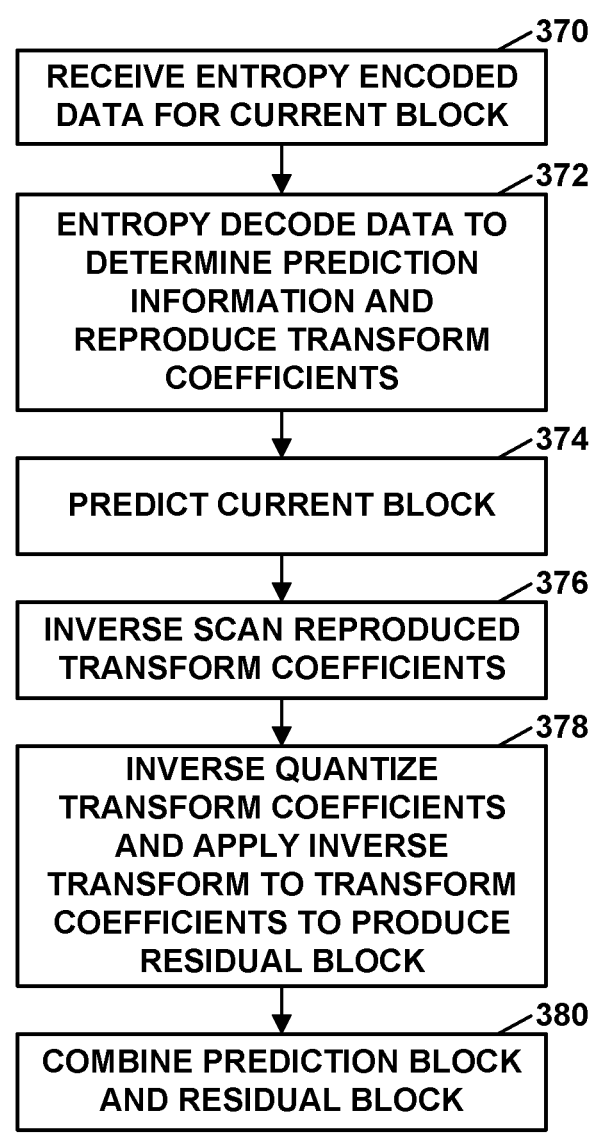

RECEIVE ENTROPY ENCODED DATA FOR CURRENT BLOCK — 370

ENTROPY DECODE DATA TO DETERMINE PREDICTION INFORMATION AND REPRODUCE TRANSFORM COEFFICIENTS — 372

PREDICT CURRENT BLOCK — 374

INVERSE SCAN REPRODUCED TRANSFORM COEFFICIENTS — 376

INVERSE QUANTIZE TRANSFORM COEFFICIENTS AND APPLY INVERSE TRANSFORM TO TRANSFORM COEFFICIENTS TO PRODUCE RESIDUAL BLOCK — 378

COMBINE PREDICTION BLOCK AND RESIDUAL BLOCK — 380

FIG. 11

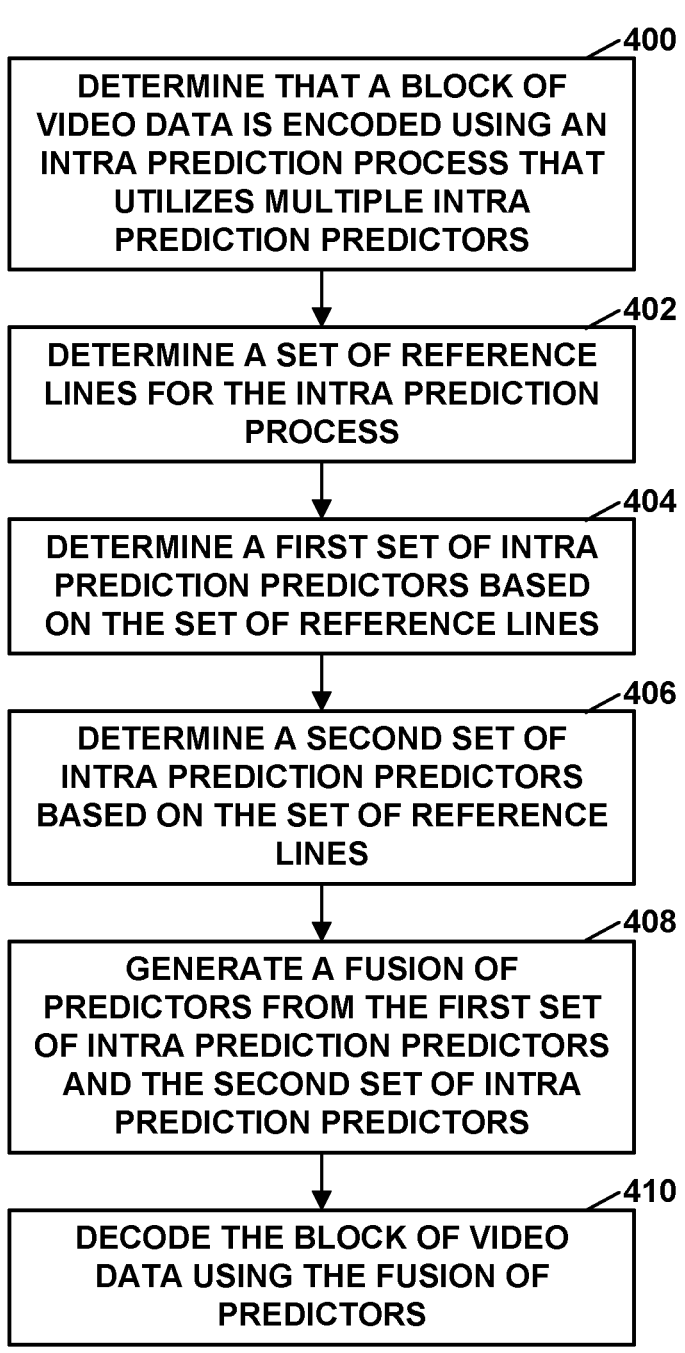

DETERMINE THAT A BLOCK OF VIDEO DATA IS ENCODED USING AN INTRA PREDICTION PROCESS THAT UTILIZES MULTIPLE INTRA PREDICTION PREDICTORS

400

DETERMINE A SET OF REFERENCE LINES FOR THE INTRA PREDICTION PROCESS

402

DETERMINE A FIRST SET OF INTRA PREDICTION PREDICTORS BASED ON THE SET OF REFERENCE LINES

404

DETERMINE A SECOND SET OF INTRA PREDICTION PREDICTORS BASED ON THE SET OF REFERENCE LINES

406

GENERATE A FUSION OF PREDICTORS FROM THE FIRST SET OF INTRA PREDICTION PREDICTORS AND THE SECOND SET OF INTRA PREDICTION PREDICTORS

408

DECODE THE BLOCK OF VIDEO DATA USING THE FUSION OF PREDICTORS

INTRA PREDICTION FUSION WITH REDUCED COMPLEXITY IN VIDEO CODING

This application claims the benefit of:

U.S. Provisional Application No. 63/375,163, filed Sep. 9, 2022,

U.S. Provisional Application No. 63/377,677, filed Sep. 29, 2022, and

U.S. Provisional Application No. 63/382,961, filed Nov. 9, 2022, the entire contents of each being incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure relate to intra prediction and, more particularly, to intra prediction fusion. According to the techniques of this disclosure, intra-prediction may be performed using two or more lines of reference samples to form fused reference predictors. That is, a video coder may combine (e.g., fuse) reference samples from two or more lines of reference samples to form a new fusion of predictors that may be used to code video data according to an intra-prediction mode.

In one example, a video coder may determine a set of reference lines for the intra prediction process, determine a first set of intra prediction predictors based on the set of reference lines, and determine a second set of intra prediction predictors based on the set of reference lines. By generating a fusion of predictors from the first set of intra prediction predictors and the second set of intra prediction predictors, a video coder may generate more accurate prediction blocks which may not only lead to smaller residual data that can be compressed more efficiently, but also improve visual quality (e.g., because a more accurate block prediction algorithm decreases the errors and artifacts introduced during the compression and decompression process). Additionally, the techniques of this disclosure may lead to faster coding times and lower computational resource requirements, which may be particularly important for resource-constrained devices and applications like streaming. As described in more detail below, the techniques of this disclosure may reduce the complexity associated with intra prediction fusion and, thus, improve the trade-off between performance and complexity.

According to an example of this disclosure, a method of decoding video data includes determining that a block of video data is encoded using an intra prediction process that utilizes multiple intra prediction predictors; determining a set of reference lines for the intra prediction process; determining a first set of intra prediction predictors based on the set of reference lines; determining a second set of intra prediction predictors based on the set of reference lines; generating a fusion of predictors from the first set of intra prediction predictors and the second set of intra prediction predictors; and decoding the block of video data using the fusion of predictors.

According to an example of this disclosure, a device for decoding video data includes: a memory configured to store video data; one or more processors implemented in circuitry and configured to: determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; generate a fusion of predictors from the first set of intra prediction predictors and the second set of intra prediction predictors; and decode the block of video data using the fusion of predictors.

A computer-readable storage medium stores instructions that when executed by one or more processors cause the one or more processors to determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; generate a fusion of predictors from the first set of intra prediction predictors and the second set of intra prediction predictors; and decode the block of video data using the fusion of predictors.

An apparatus for decoding video data includes means for determining that a block of video data is encoded using an intra prediction process that utilizes multiple intra prediction predictors; means for determining a set of reference lines for the intra prediction process; means for determining a first set of intra prediction predictors based on the set of reference lines; means for determining a second set of intra prediction predictors based on the set of reference lines; means for generating a fusion of predictors from the first set of intra prediction predictors and the second set of intra prediction predictors; and means for decoding the block of video data using the fusion of predictors.

The details of one or more examples are set forth in the accompanying drawings and the description below. Other features, objects, and advantages will be apparent from the description, drawings, and claims.

BRIEF DESCRIPTION OF DRAWINGS

FIG. 11 is a flowchart illustrating an example process for decoding a current block in accordance with the techniques of this disclosure.

FIG. 12 is a flowchart illustrating an example process for decoding a current block in accordance with the techniques of this disclosure.

DETAILED DESCRIPTION

Figure 1:
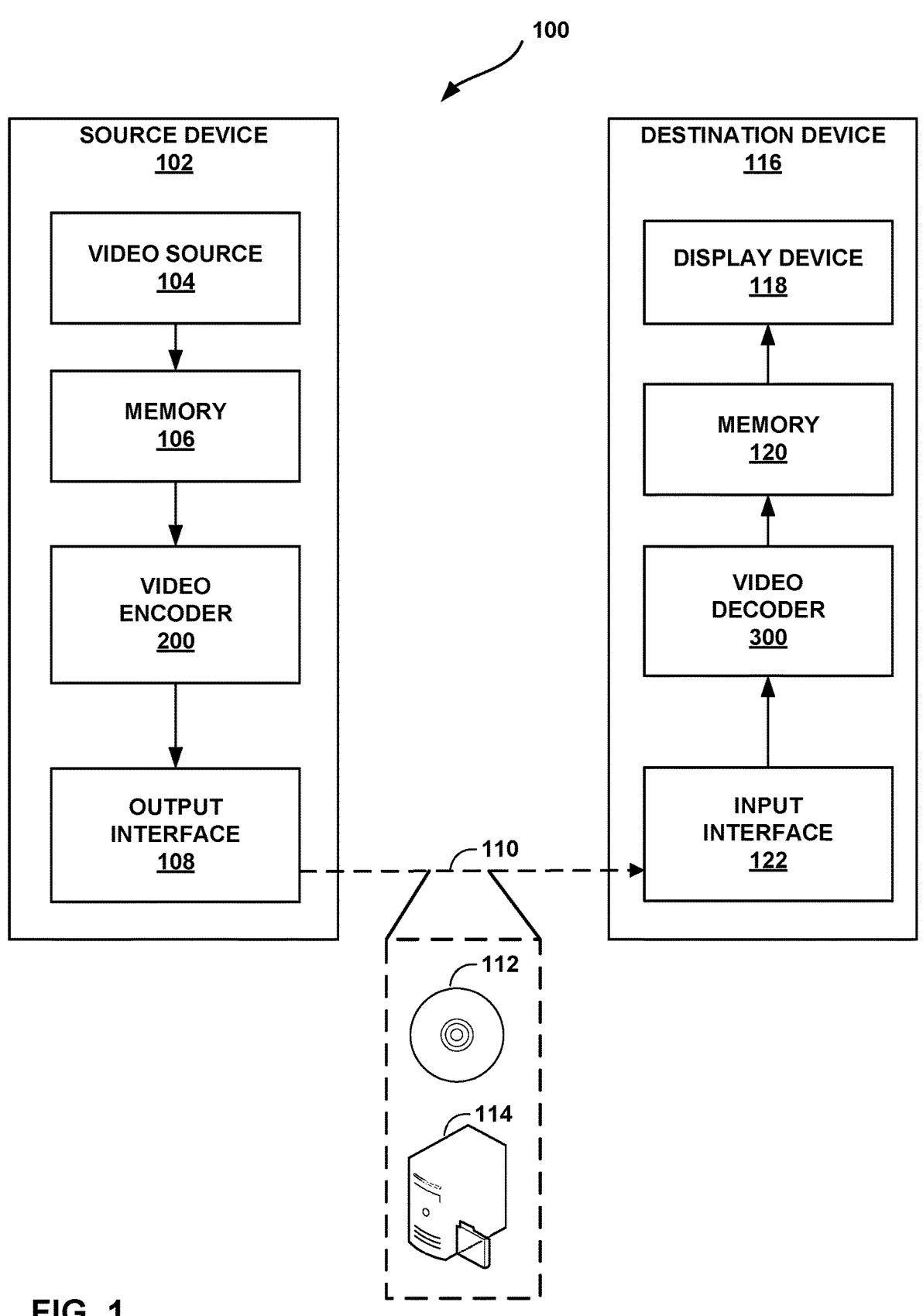
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. To further improve the quality of decoded video, a video decoder can perform one or more filtering operations on the reconstructed video blocks.

The techniques of this disclosure relate to intra prediction and, more particularly, to intra prediction fusion. According to the techniques of this disclosure, intra-prediction may be performed using two or more lines of reference samples to form fused reference predictors. That is, a video coder may combine (e.g., fuse) reference samples from two or more lines of reference samples to form a new fusion of predictors that may be used to code video data according to an intra-prediction mode. For example, a video coder may determine a set of reference lines for the intra prediction process, determine a first set of intra prediction predictors based on the set of reference lines, and determine a second set of intra prediction predictors based on the set of reference lines. By generating a fusion of predictors from the first set of intra prediction predictors and the second set of intra prediction predictors, a video decoder may generate more accurate prediction blocks which may not only lead to smaller residual data that can be compressed more efficiently, but also improve visual quality (e.g., because a more accurate block prediction algorithm decreases the errors and artifacts introduced during the compression and decompression process). Additionally, the techniques may lead to faster decoding times and lower computational resource requirements, which may be particularly important for resource-constrained devices and applications like streaming. As described in more detail below, the techniques of this disclosure may reduce the complexity associated with intra prediction fusion and, thus, improve the trade-off between performance and complexity.

FIG. 1 is a block diagram illustrating an example video encoding and decoding system 100 that may perform the intra prediction fusion techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra prediction fusion described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for intra prediction fusion described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116.

In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use intra prediction.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an NxN block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder

300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure describes techniques to improve the trade-off between performance and complexity of video coding technology. The techniques disclosed herein can be applied to ECM or any other video codec.

As introduced above and explained in more detail below, video encoder 200 and video decoder 300 may be configured to perform intra prediction. Intra prediction is often a fundamental component of a video codec. For a current CU, video encoder 200 and video decoder 300 may be configured to generate a prediction of samples inside the CU from a reference line according to different intra prediction modes, such as planar mode, DC mode, and angular modes.

Figure 2:
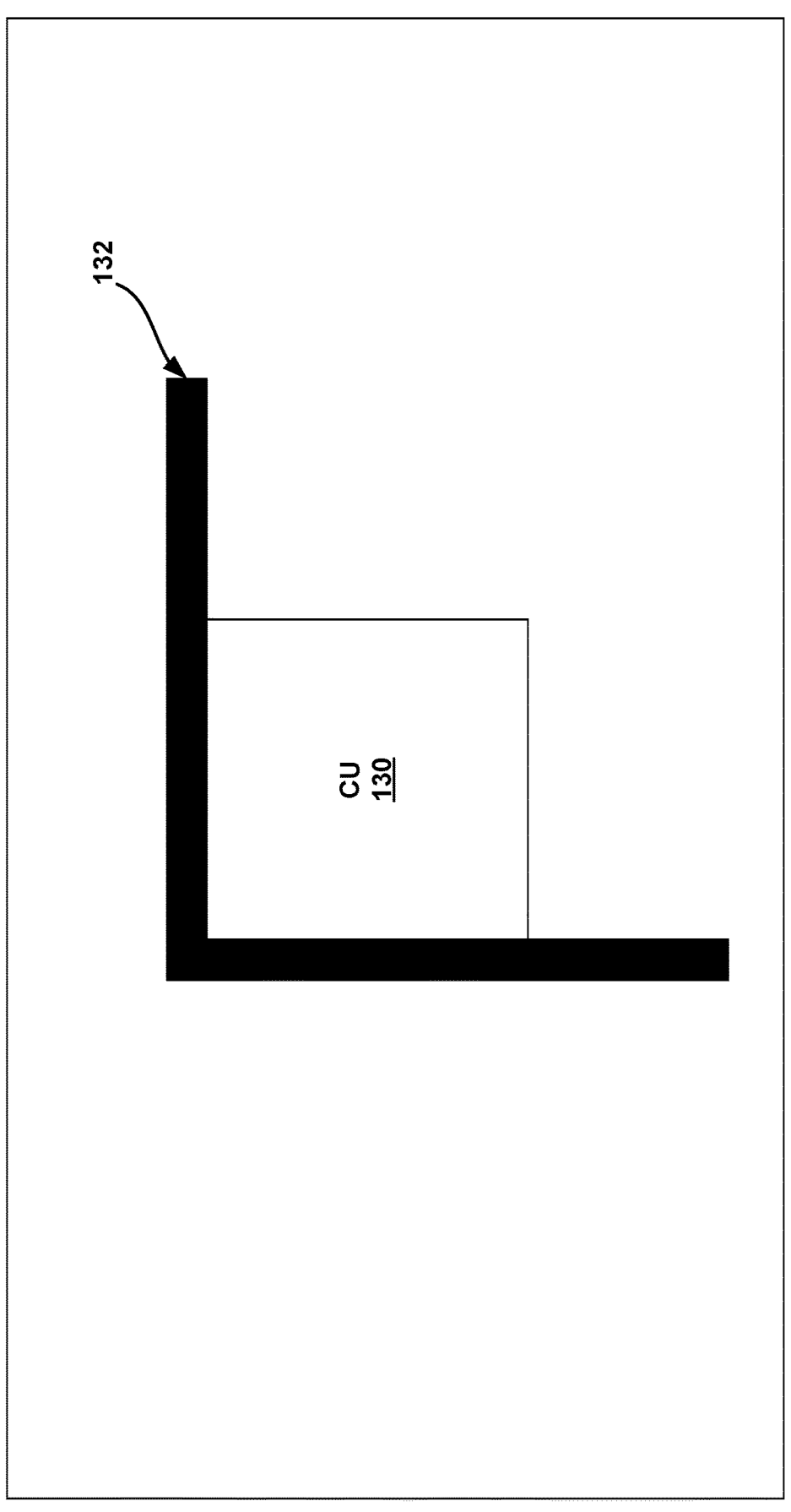
FIG. 2 shows an example of a coding unit (CU) with an adjacent reference line that can be used for intra prediction.

FIG. 2 shows an example of a CU 130 with an adjacent reference line 132. In some examples, the default reference line is the line that is the closest to the CU as shown by CU 130 and reference line 132 in FIG. 2. For an angular mode, video encoder 200 and video decoder 300 decide, based on a mode direction, whether to perform interpolation of reference samples with a 6- or 4-tap filter, to smooth the reference samples with a gaussian filter, or to directly copy the reference sample values.

Video encoder 200 and video decoder 300 may also be configured to use multiple reference lines. In some examples, the default reference line is the first line (e.g., line 132 in FIG. 2.) that is above and/or to the left of the current CU.

Figure 3:
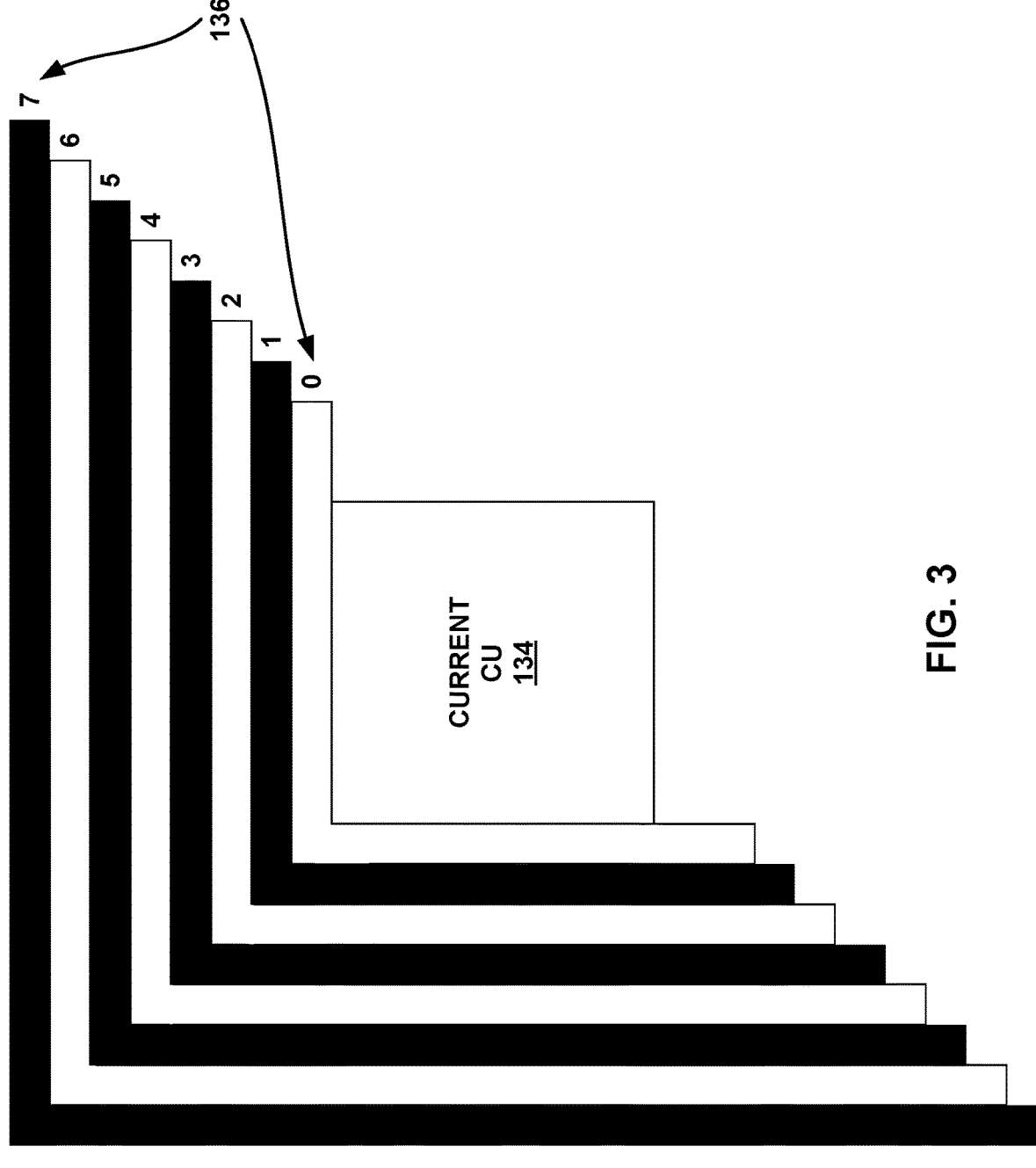
FIG. 3 shows an example of a current CU with multiple reference lines that can be used for intra prediction.

FIG. 3 shows an example of current CU 134 with multiple reference lines 136. In addition to default reference line 0, video encoder 200 and video decoder 300 may also be configured to perform intra prediction using other reference lines, such as any one or more of reference lines 0-7 or combinations of reference lines 0-7.

Video encoder 200 and video decoder 300 may be configured to perform decoder-side intra mode derivation (DIMD). In intra prediction, besides the normal prediction modes, such as planar mode, DC mode, and the angular modes, video encoder 200 and video decoder 300 may also be configured to utilize another mode, referred to herein as decoder-side intra mode, which is described in U.S. Provisional Patent Application 63/368,221 filed 12 Jul. 2022 (hereinafter the "'221 application") and U.S. patent application Ser. No. 18/339,302 filed 22 Jun. 2023. When decoding a block using DIMD, video decoder 300 derives the coding mode without explicit signaling in the bitstream.

Video decoder 300 may perform the same derivation techniques performed by video encoder 200, such that both video encoder 200 and video decoder 300 determine the same mode.

Video encoder 200 and video decoder 300 may be configured to derive the coding mode using a histogram of gradient (HoG). HoG is, for example, a vector of length 67 with each element denoting the magnitude of the corresponding direction, and thus HoG may create a cue for a possible angular mode. For a current CU, the HoG may be computed with reconstructed samples from an above reconstructed neighbor, a left reconstructed neighbor, and a top-left corner neighbor.

Video encoder 200 and video decoder 300 may be configured to fuse the first two angular modes from HoG with the two highest magnitudes with the planar mode as the final prediction from DIMD. Given the magnitude of mode1 and mode2 from DIMD as mag1 and mag2, the weights of fusion for mode1, mode2, and planar mode may correspondingly be $$\frac{2mag1}{(mag1 + mag2)}, \frac{2mag2}{(mag1 + mag2)},$$

and $\frac{1}{3}$.

Figure 4:
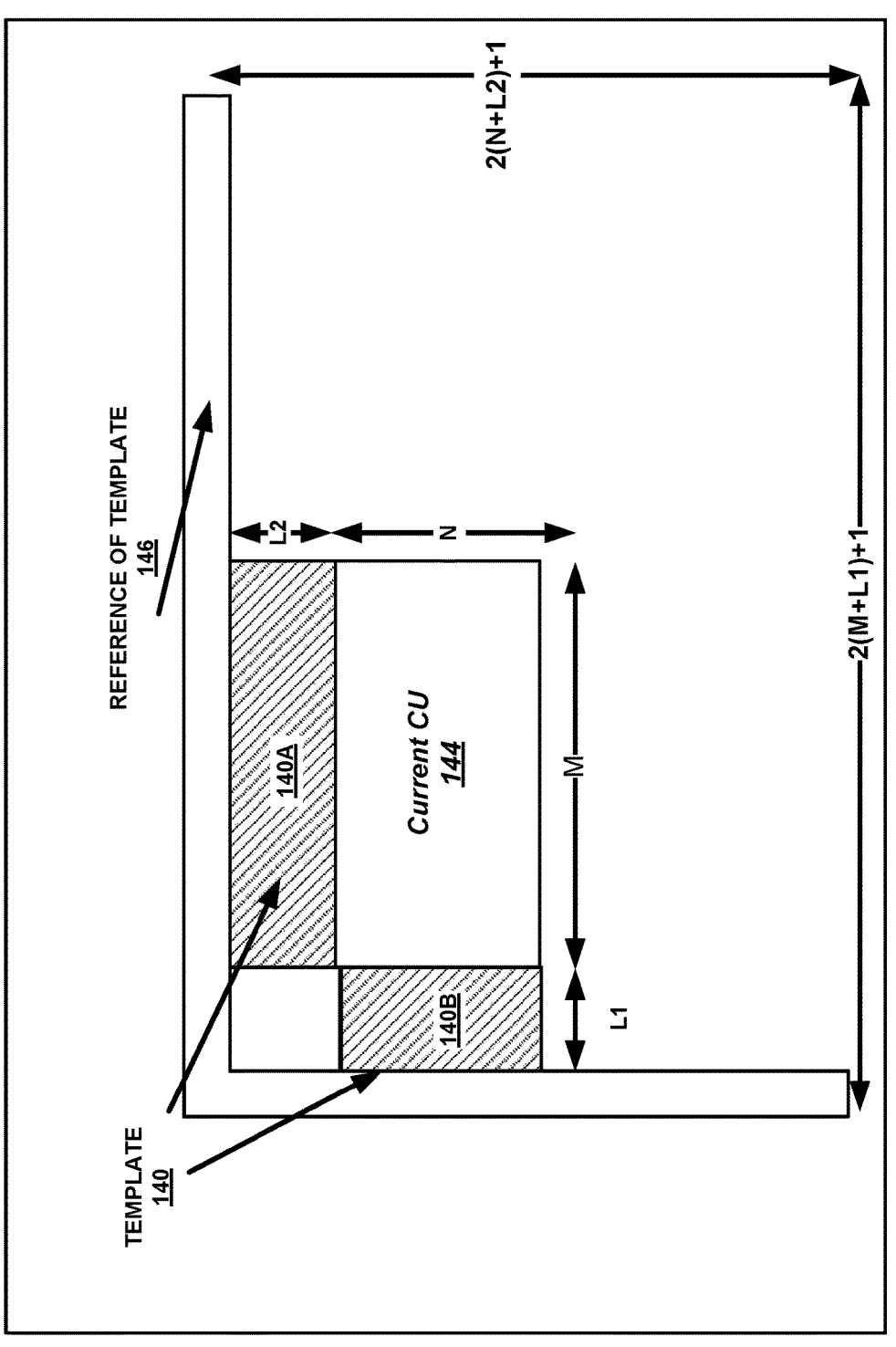
FIG. 4 shows an example of Template-based Intra Mode Derivation (TIMD).

FIG. 4 shows an example of template-based intra mode derivation (TIMD). Video encoder 200 and video decoder 300 may be configured to perform TIMD, which is another decoder-side intra mode derivation technique. FIG. 4 shows an example of a template 140 and the corresponding reference samples used in TIMD. Given a current CU 144, two template regions are chosen (above the current CU (template region 140A) and left of the current CU (template region 140B), and the reference of the template 146 is chosen correspondingly. For each mode in a most probable mode (MPM) list, video encoder 200 and video decoder 300 generates prediction for the template regions (140A and 140B) and computes an SATD cost for the template region between the prediction and the reconstruction samples. The mode with the lowest cost is chosen as the mode for TIMD.

For the first two modes with the least SATD cost, given the SATD cost for mode1 and mode2 as cost1 and cost2, if 2*cost1<cost2, then the modes, e.g., the predictors of the modes, are fused together as the final prediction from TIMD, and the fusion weights are $$\frac{2mag1}{3(mag1 + mag2)}, \frac{2mag2}{3(mag1 + mag2)},$$

Otherwise, only mode1 is picked without fusion.

Figure 5:
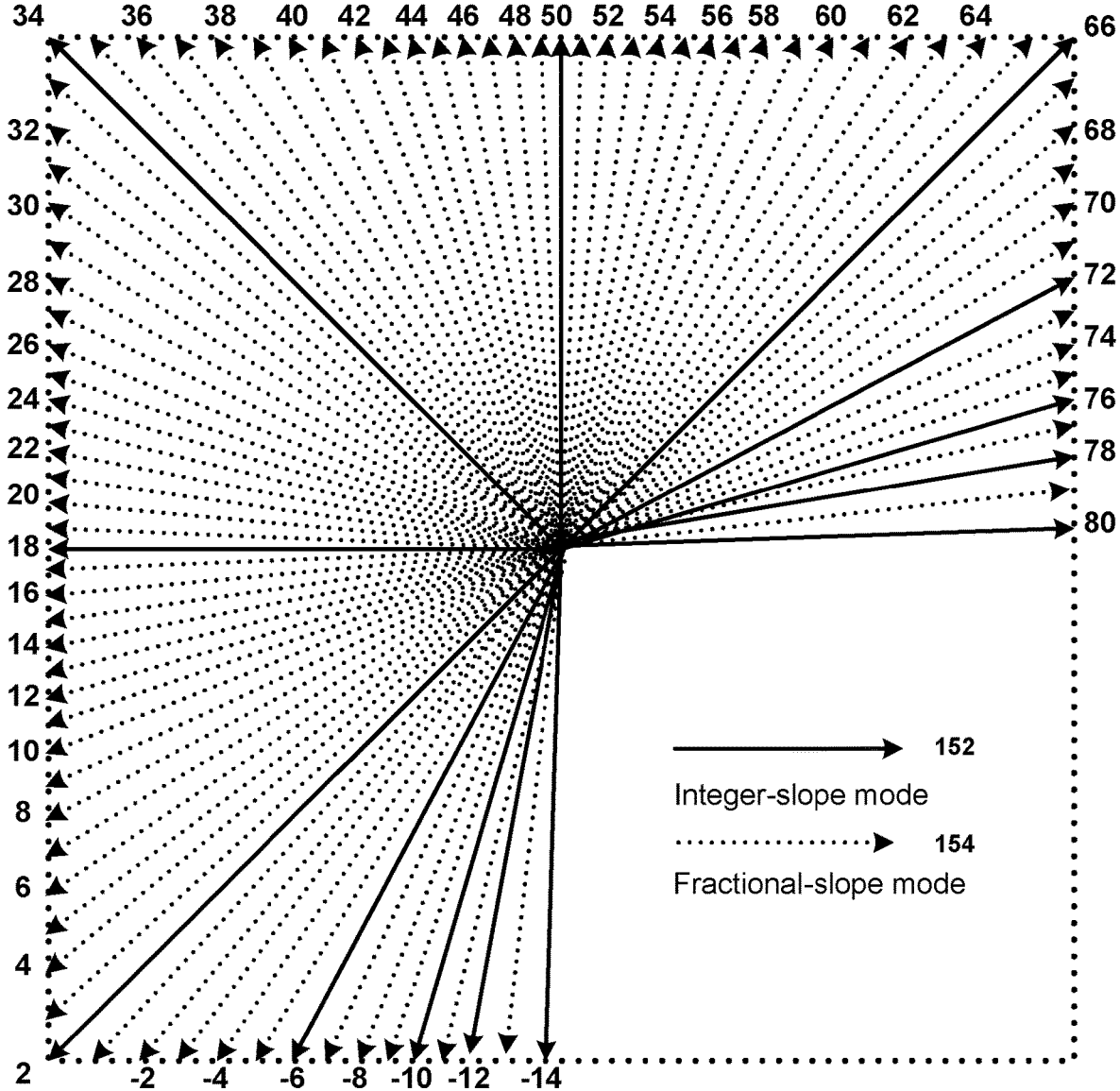
FIG. 5 shows an example of angular intra prediction modes.

Video encoder 200 and video decoder 300 may be configured to use angular modes with integer slopes or non-integer slopes. FIG. 5 shows an example of angular modes in ECM. In FIG. 5, the arrows show different angular modes indicating different directions in ECM, with arrows 152 corresponding to modes with integer slopes, and arrows 154 corresponding to modes with fractional, or non-integer, slopes.

Figure 6:
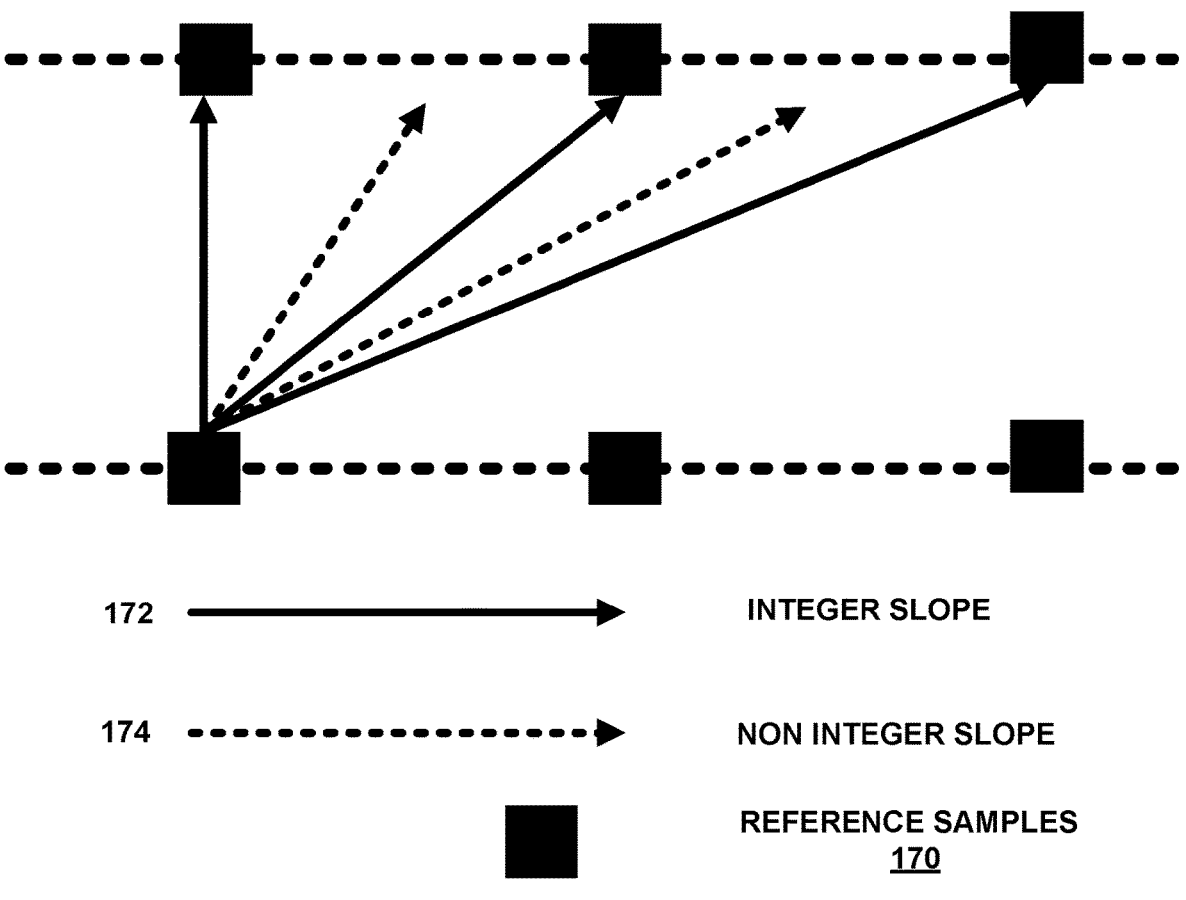
FIG. 6 shows an example of intra prediction modes with integer slopes and non-integer slopes.

FIG. 6 shows how directions for some angular modes fall between reference samples 170 and directions for some angular modes fall on reference samples 170. In the example of FIG. 6, modes represented by arrows 172 have integer slopes and fall on samples 170. The modes represented by arrows 174 have non-integer slopes and fall in between samples 170.

Video encoder 200 and video decoder 300 may be configured to construct MPM lists. In intra prediction, an MPM list is generated for each PU. When the prediction mode needs to be encoded, instead of directly writing a mode into the bitstream, via a multi-bit syntax element for example, an index of the actual chosen mode from the MPM list may be encoded using fewer bits.

In ECM, video encoder 200 and video decoder 300 construct MPM lists of length 22 that include two parts. The first six modes in the MPM list are called primary MPMs. Those modes include planar mode, the mode from a left PU, the mode from an above PU, the mode from a below-left PU, the mode from an above-right PU, and the mode from an above-left PU. The next 16 modes in the MPM list are referred to as the secondary MPM list, which includes modes derived by offsets from the modes in the primary MPM list. DIMD modes mode1 and mode2 are added after the primary MPM and before the secondary MPMs in the final MPM list.

The other modes that are not included into the MPM list are added to a list named non-MPM. A separate MPM list is also generated for a chroma channel, where the first four modes of the chroma MPM list correspond to the modes in the luma MPM list.

In some examples, video encoder 200 and video decoder 300 may code blocks of video data using a position dependent intra prediction combination (PDPC) mode. In VVC, PDPC is a process which combines an intra prediction block with boundary reference samples. The weights used for the combination process of each sample depends on the position of the sample. When PDPC is enabled for a block, the sample of each position (x', y') is derived from the equation as follows:

$$\text{pred}(x',y')=\text{Clip}(0,(1\ll\text{BitDepth})-1,(wL\times R_{-1,y'}+wT\times R_{x',-1}+(64-wL-wT)\times\text{pred}(x',y')+32)\gg6),$$

where $R_{-1,y'}$ and $R_{x',-1}$ refer to the boundary reference samples, and the clip operation makes sure the output of PDPC samples have a valid range.

An intra fusion process, which improves the performance of intra prediction using the predictors derived from more than one reference line, is proposed in K. Cao, V. Seregin, M. Karczewicz, "Non-EE2: Intra Prediction Fusion," JVET-AA0137, July 2022. In the techniques of JVET-AA0137, multiple reference lines are involved in the generation of predictors used in intra prediction modes (e.g., regular intra prediction modes, MRL modes, TIMD/DIMD modes). For some modes, (e.g., TIMD, DIMD), other types of fusion or blending operations are also involved. This disclosure describes techniques to achieve better trade-offs between performance and complexity by modifying the intra fusion techniques of JVET-AA0137 to take the characteristics of the existing fusion/blending operations into consideration. The techniques described herein can be used individually or in any combination.

In accordance with the techniques of this disclosure, video encoder 200 and video decoder 300 may be configured to use multiple reference lines. In some examples, for a mode that uses multiple intra prediction predictors, a set of reference lines is created, and one reference line or a subset of the reference lines is selected for the generation of each predictor. In some examples, for TIMD mode as described above, two intra prediction modes (mode1 and mode2) might be selected using template matching. In this case, a set of two reference lines is created and mode1 uses one reference line and mode2 uses the other. As one example, video decoder 300 may determine predictors by applying weights of 0/1 and 1/0 to the two reference lines to determine two sets of predictors. Video decoder 300 may then fuse the two sets of predictors based on cost as described above with respect to TIMD.

In some examples, for DIMD mode as described above, mode1 and mode2 could be selected and the final predictor is generated by combining the mode1 predictor, the mode2 predictor, and the planar predictor. In this case, a set of 2 reference lines is created, with mode1 using one reference line and mode2 using the other. More generally, for any video coding tool that uses M intra predictors, a set of N reference lines can be created and from which each intra predictor choose one reference line to use. As one example, video decoder 300 may determine predictors by applying weights of 0/1 and 1/0 to the two reference lines to determine two sets of predictors. Video decoder 300 may then fuse the two sets of predictors based on cost as described above with respect to DIMD.

In some examples, the set of N reference lines are created by using the default reference line that is used without the application of the techniques of this disclosure as one item (referred to as line[0] here) and search for additional reference lines based on the relative location and distance between other reference lines and line[0].

In some examples, in the case of 2 intra prediction modes (mode1 and mode2) are selected (e.g., TIMD and/or non-planar modes in DIMD), line[0] and the adjacent reference line that has longer distance to the current block than line[0] (referred to as line[1]) are selected as the reference line set.

In some examples, in the case of 2 intra prediction modes (mode1 and mode2) are selected (e.g., TIMD and/or DIMD), line[0] and the adjacent reference line that has shorter distance (if possible) to the current block than line[0] (referred to as line[−1]) are selected as the reference line set. If line[−1] doesn't exist. The search could stop (a set of only 1 reference line is used) or search for line[1].

In some examples, more generally, a reference line set with more than 2 lines can be created by searching the neighboring lines of line[0] in a pre-defined or signaled order. As an example, a set of N reference lines can be created by using the first N available reference lines of the series line[0], line[1], line[−1], line[2], line[−2] . . .

In some examples, when the searching process cannot find N reference lines according to the searching rule(s), a smaller set of N' reference lines is used. In some examples, if the one or multiple extra reference lines under consideration don't exist (e.g., locates outside of the picture or overlapped with the current block, etc.), then a smaller set of N' reference lines is used. In some examples, if one or multiple extra reference lines under consideration locates outside of a pre-defined or signaled area that controls the samples can be used for the current block (e.g., CTU boundary, VPDU boundary, etc.), then a smaller set of N' reference lines is used.

All the examples described in the '221 application that relate to the selection of reference lines and conditions for applying the intra prediction fusion might be used for examples of this disclosure.

Besides the selection techniques mentioned in the above examples, other selection techniques may also be used to create the reference line set and the technology should be considered in the scope of this disclosure.

In accordance with the techniques of this disclosure, video encoder 200 and video decoder 300 may be configured to use multiple intra predictors. In some examples, the described process may be applied by combining M intra predictors that are generated by different intra prediction modes. As an example, in case of DIMD, a fusion process is performed on planar mode and up to M−1 modes with the highest gradient magnitudes. A few typical values of M are 4, 5, 6, 7, etc. As another example, for TIMD model. A fusion process is performed on M models selected by template matching. A few typical values of M are 3, 4, 5, 6.

In some examples, the weights of combining N intra predictors for DIMD is derived based on the gradient magnitudes of each selected mode. In some examples, the weights of mode1, mode2, . . . , modeN−1, planar mode are $$\frac{(K-1)\cdot mag_1}{K\cdot(mag_1+mag_2+\cdots+mag_{N-1})}, \frac{(K-1)\cdot mag_2}{K\cdot(mag_1+mag_2+\cdots+mag_{N-1})},$$
$$\cdots, \frac{(K-1)\cdot mag_{N-1}}{K\cdot(mag_1+mag_2+\cdots+mag_{N-1})}, \frac{1}{K},$$

respectively. In some examples, K is set to 3. In another example, K is set to N.

In some examples, the weights of combining N intra predictors for TIMD is derived based on the SATD cost of each mode. As an example, the weight of mode n is:

$$W[n] = \frac{1}{cost_n\cdot\left(\sum_{k=1}^{N} 1/cost_k\right)}.$$

All the examples described in the '221 application related to the derivation of weights used for the fusion process and the conditions of applying the intra prediction fusion can be used in conjunction with the techniques of this disclosure.

Besides the weight derivation process described above, other weight derivation process(es) could be used in the weighted combination of the predictors and the technology should be considered in the scope of this disclosure.

Video encoder 200 and video decoder 300 may be configured to use multiple reference lines and multiple intra predictors in combination. As an example, for DIMD/TIMD, the predictor for the current block is generated by fusing M intra predictors, when generating the M predictors, a set of N reference lines is created, and each predictor uses one reference line selected from the set.

As another example, in a codec, for TIMD mode, when M modes (mode1, . . . , mode1) are selected, a set of N reference lines is created, and each mode selects one reference line. While for DIMD, planar mode and up to K−1 modes are selected and a fusion process is applied to the K predictors to generate the prediction signal of the current block. An example of M, N, K values is M=2, N=2, K=6.

Video encoder 200 and video decoder 300 may be configured to perform intra fusion/prediction with weights derived separately for each predictor.

In some examples, similar to that proposed in the '221 application for a video coding tool that uses multiple intra prediction predictors, a set of reference lines is created, all the reference lines or a subset of the reference lines is selected for the generation of each predictor. In this example, the weights used in the fusion of intra prediction signal derived using different reference lines can be different for each predictor to be generated.

As an example, for TIMD mode as described above, two intra prediction modes (mode1 and mode2) might be selected using template matching. In this case, a set of 2 reference lines is created, predictors for mode1 and mode2 are generated from the same reference line set (including both reference lines). However, the weights for the 2 reference lines are different for mode1 and mode2.

As an example, the 2 reference lines are default line (line[0]) and additional line (line[1]). Line[0] refers to the default reference line and line[1] refers to the reference line that is adjacent to line[0] and has longer distance to the current block than line[0].

As an example, for mode1 (with the lowest TIMD cost), the weights of line[0] and line[1] are ¾ and ¼, respectively. While for mode2 (with the $2^{nd}$ lowest TIMD cost), the weights of line[0] and line[1] are ¼ and ¾, respectively.

The techniques of this example may also be applied to DIMD mode that combines planar predictor and 2 other intra predictors (mode1 and mode2). Multiple reference lines can be used in the generation of each of the 2 intra predictors and the weights used to fuse intra prediction signals derived using different reference lines is defined/derived separately for mode1 and mode2.

More generally, for TIMD/DIMD or other mode that uses K intra prediction predictors, each predictor $P_k$ can be generated using $N_k$ reference lines. And the weights used to generate $P_k$ (referred to as $W_k$) might be different from each other. The weights can be fixed, derived based on predefined rules and/or information signaled in the bit-stream. Techniques for deriving weights described in this disclosure and/or in the '221 application can be applied to derive $W_k$ separately. Besides that, other weight derivation processes can be used to derive $W_k$ separately and the technology should be considered in the scope of this disclosure.

In another example of the disclosure, in the case of intra prediction with multiple predictors involved, e.g., predictors generated with different modes (e.g., TIMD, DIMD, etc.), with different reference lines (e.g., as described herein), single or multiple operations of the predictor generation process can be removed for one or multiple predictors involved.

As an example, in the case of TIMD, except the 1st mode, for other mode(s), PDPC is always disabled. This example can be applied to any TIMD implementation that uses multiple predictors, including but not limited to the examples of TIMD described above and/or any TIMD related examples described in this disclosure.

As another example, in the case of DIMD, except the planar mode, for other mode(s), PDPC is always disabled. This example can be applied to any DIMD implementation that uses multiple predictors, including but not limited to the DIMD techniques described above and/or any DIMD related examples described in this disclosure.

As another example, in case of DIMD, except the planar mode and the 1st non-planar mode, for other mode(s), PDPC is always disabled. This example can be applied to any DIMD implementation that uses multiple predictors, including but not limited to the DIMD techniques described above and/or any DIMD related examples described in this disclosure.

For all examples in this section, different examples can be created by configuring the number of mode(s) that use PDPC and which mode(s) use PDPC. As one example, PDPC may be disabled for all predictors.

Besides PDPC, any other operation(s) involved in intra predictor generation can be used to create examples of this embodiment. For example, intra reference sample smoothing, etc.

Figure 7:
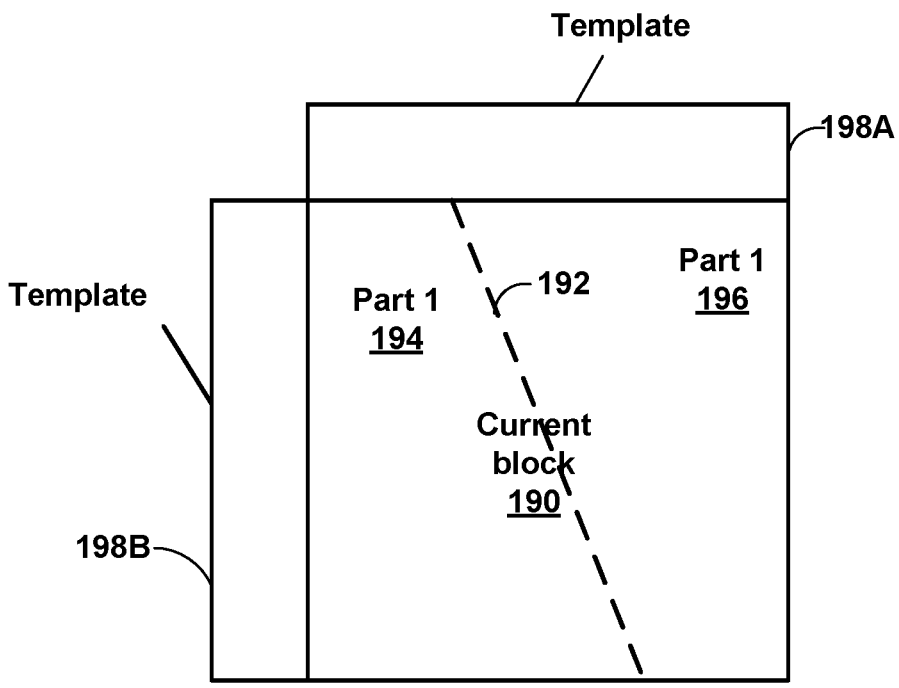
FIG. 7 is a conceptual diagram illustrating an example of spatial geometry partition mode (SGPM).

FIG. 7 is a conceptual diagram illustrating an example of spatial geometry partition mode (SGPM). According to Wang et al. "EE2-1.6: Combination of spatial GPM tests," JVET-AB0155, October 2022 (hereinafter, "JVET-AB0155"), when SGPM is applied, two intra predictors generated using different intra prediction modes (predMode0, predMode1) are combined in a way that is specified by a 'partition mode' (partMode). One example of 'partition mode' is shown in FIG. 7, where dashed line 192 splits current block 190 into two parts, part 1 194 and part 2 196, which respectively correspond to predMode0 and predMode1. That is, part 1 194 may be predicted using predMode0 and part 2 196 may be predicted using predMode1. Instead of signaling the information {predMode0, predMode1, partMode} directly in bit-streams, according to JVET-AB0155, a candidate list of 16 entries is created using template matching and the index of the selected candidate (candIdx) is signaled. The templates used for the current block are shown as templates 198A, 198B.

The techniques of this disclosure may be applied to SGPM mode. Various examples are summarized below:

In some examples, when SGPM mode is used for current block 190, intra prediction fusion is disabled.

In some examples, when SGPM mode is used for current block 190, the same intra prediction fusion is applied to each of the predictors involved. The various examples described in JVET-AA0137 can be used. As one example, for each intra prediction mode used for SGPM (predMode0 and predMode1), two reference lines may be used (line[0] and line[1], where the definition of line[0] and line[1] can be found above). The weight used for line[0] predictor may be ¾ and the weight used for line[1] predictor may be ¼.

In some examples, when SGPM mode is used for current block 190, the techniques discussed above regarding the use of multiple reference lines may be applied. For example, for predMode0, line[0] may be used, and for predMode1, line [1] may be used. As another example, if predMode1 has a smaller template matching cost than predMode0, line[0] may be used for predMode1 and line[1] may be used for predMode0; otherwise, line[0] may be used for predMode0 and line[1] may be used for predMode1.

In some examples, when SGPM mode is used for current block 190, the techniques discussed above regarding intra fusion/prediction with weights derived separately for each predictor may be used. For example, for predMode0, the weights of line[0] and line[1] may be ¾ and ¼ respectively, whereas for predMode1, the weights of line[0] and line[1] may be ¼ and ¾, respectively. As another example, the template matching costs of predMode0 and predMode1 may be compared, and for the mode with smaller template matching cost, the weights of line[0] and line[1] may be ¾ and ¼, respectively; for the other mode, the weights of line[0] and line[1] may be ¼ and ¾, respectively.

In some examples, when SGPM mode is used for current block 190, information related to intra prediction fusion is included in the signaling of candIdx. In this case, each item in the candidate list may include {predMode0, predMode1, partMode, fuseMode}, where predMode0, predMode1, and partMode have the same meaning as that described above, and fuseMode controls how the techniques of this disclosure (intra prediction fusion) are applied to current block 190. For example, the possible values of fuseMode may include 0 and 1; when fuseMode==0, intra prediction fusion is disabled, and when fuseMode==1, intra prediction fusion is enabled. As another example, fuseMode may have a value range of [0, 4]; when fuseMode==n, the weight used for line[0] is n/4 and the weight used for line[1] is $$\frac{4-n}{4}.$$

Figure 8:
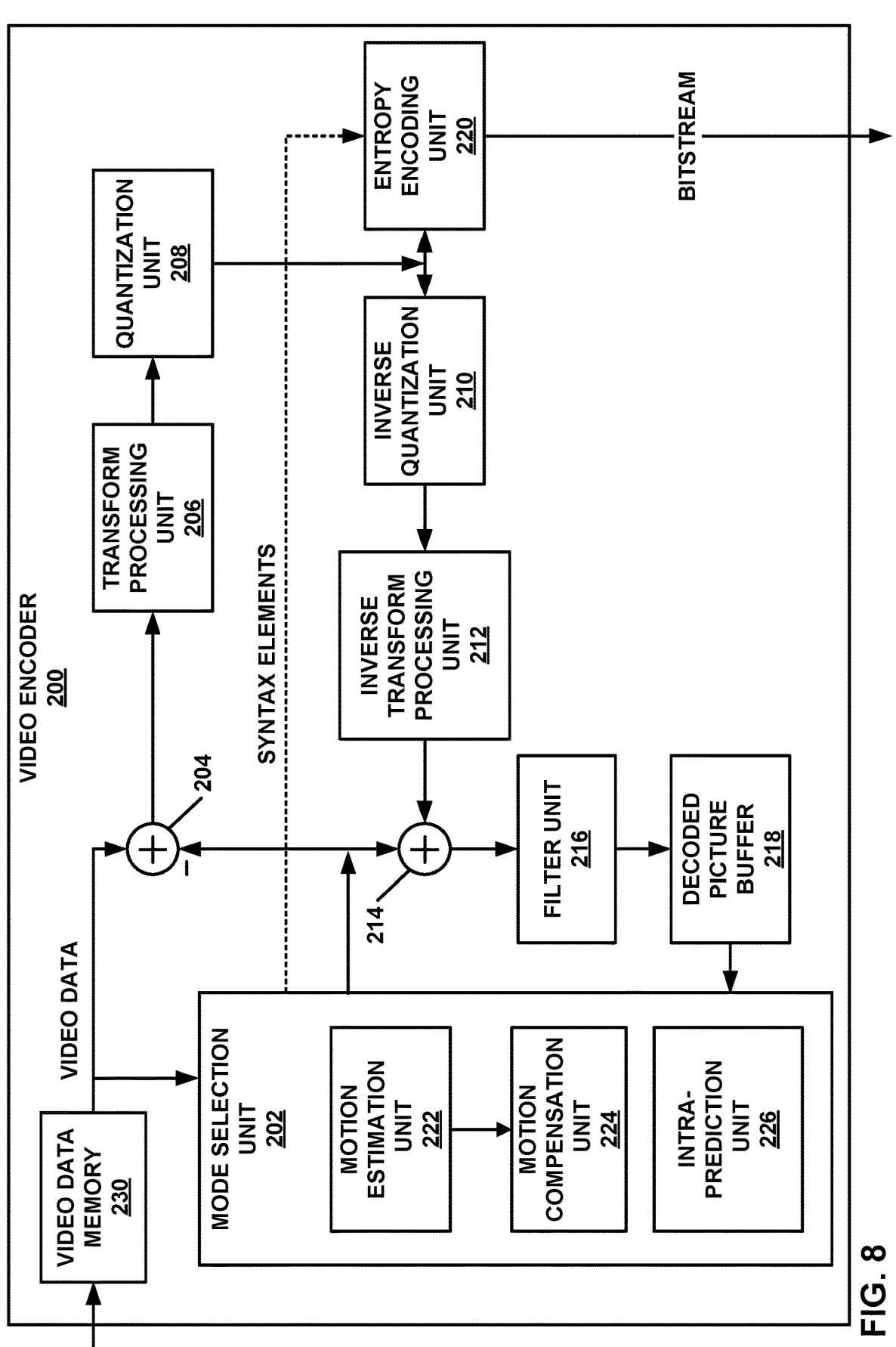
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Intra-prediction unit 226 may be configured to perform the techniques of this disclosure. For example, intra-prediction unit 226 may be configured to determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; and generate a fusion of predictors from the first set of intra prediction predictors and the second set of intra prediction predictors.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to generate a fusion of predictors for a block from samples of a set of reference lines for the block and encode the block of using the fusion of predictors.

Figure 9:
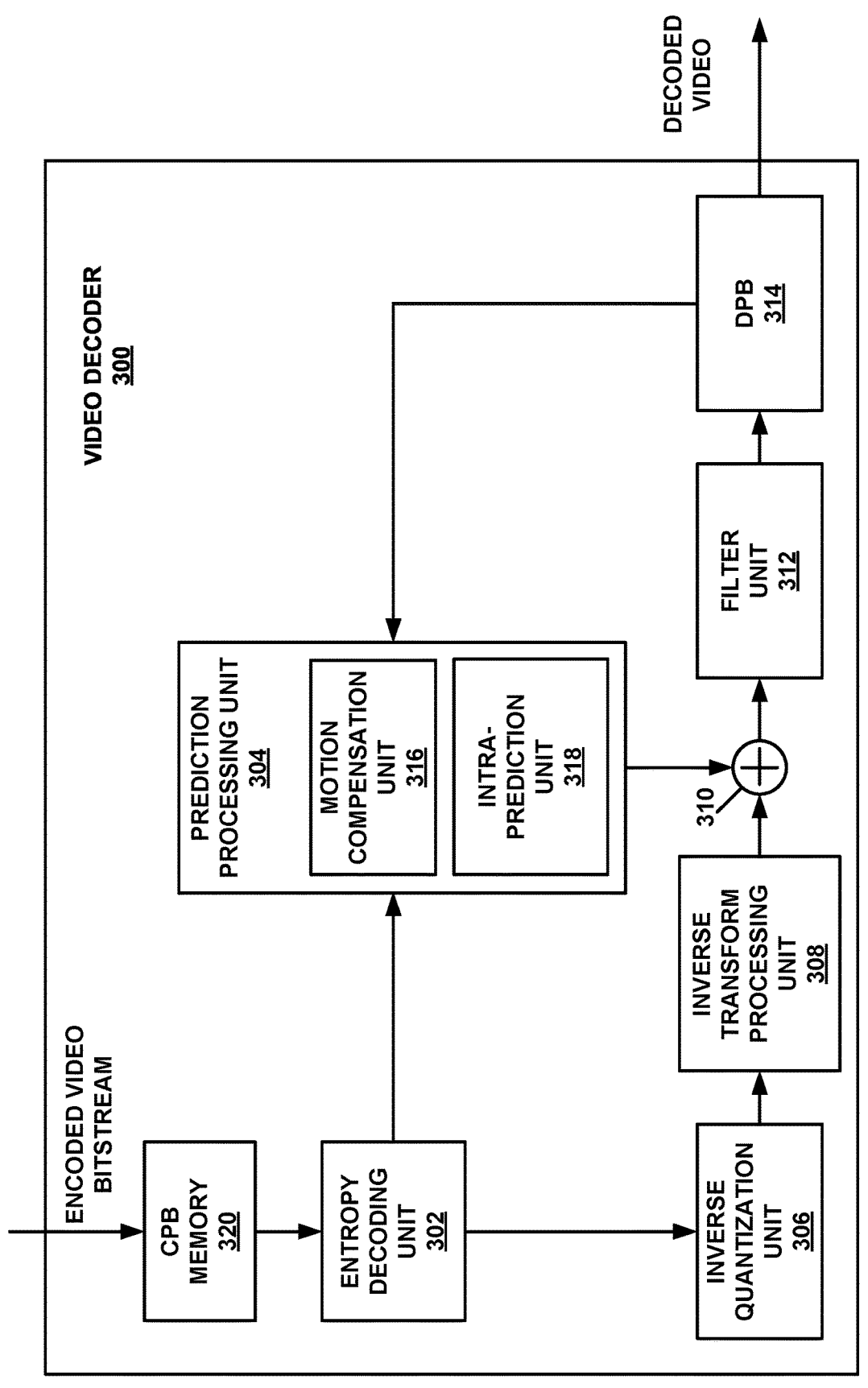
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Intra-prediction unit 318 may be configured to perform the techniques of this disclosure. For example, intra-prediction unit 318 may be configured to determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; and generate a fusion of predictors from the first set of intra prediction predictors and the second set of intra prediction predictors.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to generate a fusion of predictors for a block from samples of a set of reference lines for the block and decode the block of using the fusion of predictors.

Figure 10:
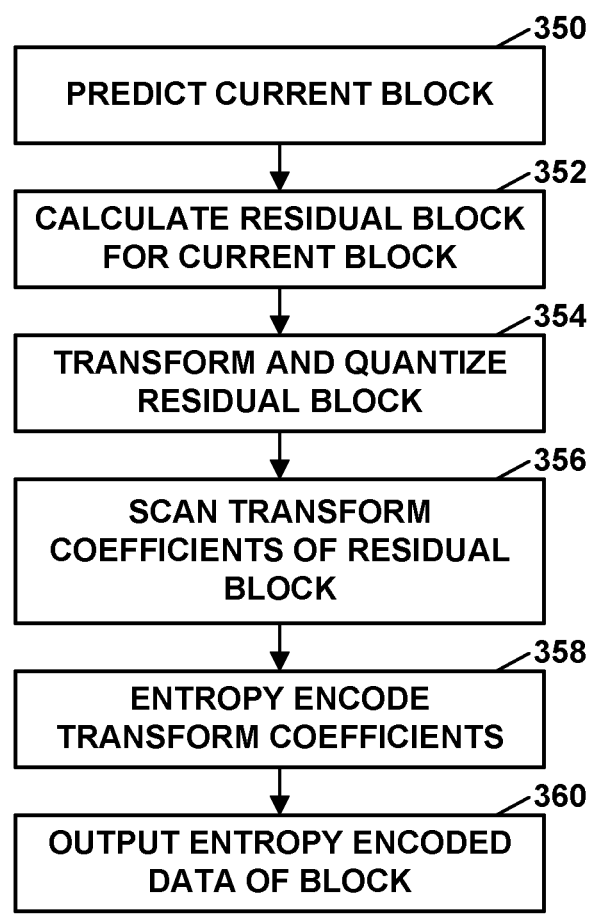
FIG. 10 is a flowchart illustrating an example process for encoding a current block in accordance with the techniques of this disclosure.

FIG. 10 is a flowchart illustrating an example process for encoding a current block in accordance with the techniques of this disclosure. The current block may comprise a current CU. Although described with respect to video encoder 200 (FIGS. 1 and 8), it should be understood that other devices may be configured to perform a process similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

FIG. 11 is a flowchart illustrating an example process for decoding a current block of video data in accordance with the techniques of this disclosure. The current block may comprise a current CU. Although described with respect to video decoder 300 (FIGS. 1 and 9), it should be understood that other devices may be configured to perform a process similar to that of FIG. 11.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

FIG. 12 is a flowchart illustrating an example process for decoding a current block of video data in accordance with the techniques of this disclosure. The current block may comprise a current CU. Although described with respect to video decoder 300 (FIGS. 1 and 9), it should be understood that other devices, including video encoder 200, may also be configured to perform a process similar to that of FIG. 11.

Video decoder 300 determines that a block of video data is encoded using an intra prediction process that utilizes multiple intra prediction predictors (400). Video decoder 300 determines a set of reference lines for the intra prediction process (402). Video decoder 300 determines a first set of intra prediction predictors based on the set of reference lines (404).

Video decoder 300 determines a second set of intra prediction predictors based on the set of reference lines (406). In some example, video decoder 300 may also determine a third set of intra prediction predictors or additional sets of intra prediction predictors. Video decoder 300 generates a fusion of predictors from the first set of intra prediction predictors and the second set of intra prediction predictors (408). If video decoder 300 determines a third set of intra prediction predictors or additional sets of intra prediction predictors, then video decoder 300 may generate the fusion of predictors also from the third or additional sets of intra prediction predictors.

Video decoder 300 may, for example, be configured to determine a first weight based on the intra prediction process and determine a second weight based on the intra prediction process. To generate the fusion of predictors from the first set of intra prediction predictors and the second set of intra prediction predictors, video decoder 300 may apply the first weight to the first set of intra prediction predictors and the second weight to the second set of intra prediction predictors to combine the first set of intra prediction predictors and the second set of intra prediction predictors. In some examples, the intra prediction process may be a template-based intra mode derivation process, and video decoder 300 may be configured to determine the first weight based on the intra prediction process comprises determining the first weight based on a first template matching cost for the first set of intra prediction predictors and determine the second weight based on the intra prediction process comprises determining the second weight based on a second template matching cost for the second set of intra prediction predictors. Video decoder 300 may, for example, determine the first set of intra prediction predictors based on the set of reference lines comprises determining the first set of intra prediction predictors based on a first line of the set of reference lines and determine a second set of intra prediction predictors based on the set of reference lines by determining the second set of intra prediction predictors based on a second line of the set of reference lines that is different than the first line.

In some examples, the intra prediction process may be a decoder-side intra mode derivation process, and video decoder 300 may be configured to determine the first weight based on the intra prediction process comprises determining the first weight based on a first magnitude of a histogram of gradient for the first set of intra prediction predictors and determine the second weight based on the intra prediction process comprises determining the second weight based on a second magnitude of a histogram of gradient for the second set of intra prediction predictors.

In some examples, the set of reference lines may include a first line of samples and a second line of samples that is different than the first line of samples, and video decoder 300 may determine the first set of intra prediction predictors based on the set of reference lines by applying a first set of weights to the first line of samples and the second line of samples and determine the second set of intra prediction predictors based on the second set of samples from the set of reference lines by applying a second set of weights to the first line of samples and the second line of samples. Video decoder 300 may, for example, apply the first set of weights to the first set of samples and the second set of samples by applying a weighting of zero to the first set of samples and apply the second set of weights to the first set of samples and the second set of samples by applying the weighting of zero to the second set of samples.

In examples where video decoder 300 determines a third set of intra prediction predictors or additional sets of intra prediction predictors, video decoder 300 may, for example, determine a first weight based on the intra prediction process, determine a second weight based on the intra prediction process, and set a third weight equal to one-third. To generate the fusion of predictors from the first set of intra prediction predictors and the second set of intra prediction predictors, video decoder 300 may apply the first weight to the first set of intra prediction predictors, the second weight to the second set of intra prediction predictors, and the third weight to the third set of intra prediction predictors to combine the first set of intra prediction predictors, the second set of intra prediction predictors, and the third set of intra prediction predictors.

In some example, video decoder 300 may determine that a second block of the video data is encoded using SGPM, and in response, determine that intra prediction fusion is disabled for the second block.

Video decoder 300 decodes the block of video data using the fusion of predictors (410). Video decoder 300 may, for example, use the fusion of predictors to generate a prediction block, add residual values to the prediction block to determine a reconstructed block, and perform one or more filtering options on the reconstructed block to determine a decoded block. Video decoder 300 may output the decoded block by outputting pictures of decoded video data for display, outputting the pictures for storage for later display, or outputting the pictures for storage for use in decoding other pictures of the video data.

The following numbered clauses illustrate one or more aspects of the devices and techniques described in this disclosure.

Clause 1A. A method of decoding video data, the method comprising: generating a fusion of predictors from samples of a set of reference lines for the block of video data; and coding the block of video data using the fusion of predictors.

Clause 2A. The method of clause 1A, wherein the set of reference lines of samples includes a default reference line of samples that is immediately adjacent the block of video data.

Clause 3A. The method of clause 1A or 2A, wherein the set of reference lines of samples are a subset of a larger set of reference lines of samples for a multiple reference line coding mode.

Clause 4A. The method of any of clauses 1A-3A, further comprising: determining the predictors from the set of reference lines using at least one intra prediction mode; and determining a first intra prediction mode of the at least one intra prediction mode using template matching.

Clause 5A. The method of any of claims 1A-3A, further comprising: determining the predictors from the set of reference lines using a plurality of intra prediction modes; determining a first intra prediction mode of the plurality of intra prediction modes using template matching; and determining a second intra prediction mode of the plurality of intra prediction modes using template matching.

Clause 6A. The method of any of clauses 1A-3A, further comprising: determining the predictors from the set of reference lines using a set of intra prediction modes; and determining a first intra prediction mode of the at least one intra prediction mode using decoder-side intra mode derivation.

Clause 7A. The method of clause 6A, further comprising: determining a second intra prediction mode of the set of intra prediction modes using decoder-side intra mode derivation.

Clause 8A. The method of clause 7A, further comprising: determining a third intra prediction mode of the set of intra prediction modes to be a planar mode.

Clause 9A. The method of any of clauses 1A-7A, wherein generating the fusion of predictors from the set of reference lines of samples relative to a block of video data comprises: generating the fusion of predictors based on a weighted combination of predictors from the set of reference lines of samples.

Clause 10A. The method of clause 9A, wherein a weight for the weighted combination is fixed.

Clause 11A. The method of clause 9A, wherein a weight for the weighted combination is based on a reference line.

Clause 12A. The method of clause 9A, wherein a weight for the weighted combination is based on a position of a sample in the block of video data.

Clause 13A. The method of clause 9A, wherein a weight for the weighted combination is based on distance between two reference lines of the set of reference lines.

Clause 14A. The method of clause 9A, wherein a weight for the weighted combination is based on a cost criterion.

Clause 15A. The method of clause 9A, wherein weights for the weighted combination are determined separately for each predictor.

Clause 16A. The method of any of any of clauses 1A-8A, wherein generating the fusion of predictors from the set of reference lines comprises: generating the fusion of predictors based on a weighted gradient of predictors from the set of reference lines.

Clause 17A. The method of any of clauses 1A-16A, further comprising: processing a syntax element that indicates whether to generate the fusion of predictors based on one or more of an intra prediction mode.

Clause 18A. The method of any of clauses 1A-3A, further comprising: performing, in addition to generating the fusion of predictors, one or more of a template-based intra mode derivation mode or decoder-side intra mode derivation mode.

Clause 19A. The method of any of clauses 1A-18A, wherein the method of decoding is performed as part of a video encoding process.

Clause 20A. A device for coding video data, the device comprising one or more means for performing the method of any of clauses 1A-19A and 28A-38A.

Clause 21A. The device of clause 20A, wherein the one or more means comprise one or more processors implemented in circuitry.

Clause 22A. The device of any of clauses 20A and 21A, further comprising a memory to store the video data.

Clause 23A. The device of any of clauses 20A-22A, further comprising a display configured to display decoded video data.

Clause 24A. The device of any of clauses 20A-23A, wherein the device comprises one or more of a camera, a computer, a mobile device, a broadcast receiver device, or a set-top box.

Clause 25A. The device of any of clauses 20A-24A, wherein the device comprises a video decoder.

Clause 26A. The device of any of clauses 20A-25A, wherein the device comprises a video encoder.

Clause 27A. A computer-readable storage medium having stored thereon instructions that, when executed, cause one or more processors to perform the method of any of clauses 1A-19A and 28A-38A.

Clause 28A. The method of any of clauses 1A-19A, further comprising: disabling a position dependent intra prediction combination (PDPC) mode based on an intra prediction mode.

Clause 29A: The method of any of clauses 1-19A and 28A, further comprising determining that the block is not partitioned using spatial geometry partition mode (SGPM).

Clause 30A: The method of clause 29A, further comprising: partitioning a second block of video data using SPGM; avoiding generation of a fusion of predictors from samples of a set of reference lines for the second block based on the second block being partitioned using SGPM; and coding the second block of video data.

Clause 31A: The method of any of clauses 1A-19A and 28A, further comprising determining that the block is partitioned using spatial geometry partition mode (SGPM).

Clause 32A: The method of clause 31, wherein the set of reference lines includes line[0] and line[1], wherein a weight for line[0] is ¾, and wherein a weight for line[1] is ¼.

Clause 33A: The method of any of clauses 31A and 32A, wherein the set of reference lines includes line[0] and line[1], wherein for a first prediction mode, line[0] is used, and wherein for a second prediction mode, line[1] is used.

Clause 34A: The method of any of clauses 31A-33A, wherein the set of reference lines includes line[0] and line[1], further comprising calculating a first template matching cost for a first prediction mode and a second template matching cost for a second prediction mode, wherein when the first template matching cost is greater than the second template matching cost, line[0] is used for the second prediction mode and line[1] is used for the first prediction mode, and wherein when the second template matching cost is greater than the first template matching cost, line[0] is used for the first prediction mode and line[1] is used for the second prediction mode.

Clause 35A: The method of clause 31A, wherein the set of reference lines includes line[0] and line[1], the method further comprising: applying a weight of ¾ to line[0] for a first prediction mode and a weight of ¼ to line[1] for the first prediction mode; and applying a weight of ¼ to line[0] for a second prediction mode and a weight of ¾ to line[1] for the second prediction mode.

Clause 36A: The method of clause 31A, wherein the set of reference lines includes line[0] and line[1], the method further comprising: calculating a first template matching cost for a first prediction mode and a second template matching cost for a second prediction mode; when the first template matching cost is less than the second template matching cost: applying a weight of ¾ to line[0] for the first prediction mode and a weight of ¼ to line[1] for the first prediction mode; and applying a weight of ¼ to line[0] for the second prediction mode and a weight of ¾ to line[1] for the second prediction mode; or when the first template matching cost is greater than the second template matching cost: applying a weight of ¾ to line[0] for the second prediction mode and a weight of ¼ to line[1] for the second prediction mode; and applying a weight of ¼ to line[0] for the first prediction mode and a weight of ¾ to line[1] for the first prediction mode.

Clause 37A: The method of any of clauses 1A-19A, 28A, and 31A-36A, further comprising coding a candidate index value representing a candidate in a candidate list and information representing intra prediction fusion.

Clause 38A: The method of clause 37A, wherein the information representing intra prediction fusion includes a first prediction mode, a second prediction mode, a partition mode, and a fusion mode, wherein the fusion mode indicates whether intra prediction fusion is to be performed, and when intra prediction fusion is to be performed, respective weights to be applied to the set of reference lines.

Clause 1B: A method of decoding video data, the method comprising: determining that a block of video data is encoded using an intra prediction process that utilizes multiple intra prediction predictors; determining a set of reference lines for the intra prediction process; determining a first set of intra prediction predictors based on the set of reference lines; determining a second set of intra prediction predictors based on the set of reference lines; generating a fusion of predictors from the first set of intra prediction predictors and the second set of intra prediction predictors; and decoding the block of video data using the fusion of predictors.

Clause 2B: The method of clause 1B, further comprising: determining a first weight based on the intra prediction process; determining a second weight based on the intra prediction process; and wherein generating the fusion of predictors from the first set of intra prediction predictors and the second set of intra prediction predictors comprises applying the first weight to the first set of intra prediction predictors and the second weight to the second set of intra prediction predictors to combine the first set of intra prediction predictors and the second set of intra prediction predictors.

Clause 3B: The method of clause 2B, wherein: the intra prediction process comprises a template-based intra mode derivation process; determining the first weight based on the intra prediction process comprises determining the first weight based on a first template matching cost for the first set of intra prediction predictors; and determining the second weight based on the intra prediction process comprises determining the second weight based on a second template matching cost for the second set of intra prediction predictors.

Clause 4B: The method of clause 3B, wherein: determining the first set of intra prediction predictors based on the set of reference lines comprises determining the first set of intra prediction predictors based on a first line of the set of reference lines; and determining a second set of intra prediction predictors based on the set of reference lines comprises determining the second set of intra prediction predictors based on a second line of the set of reference lines that is different than the first line.

Clause 5B: The method of clause 2B, wherein: the intra prediction process comprises a decoder-side intra mode derivation process; determining the first weight based on the intra prediction process comprises determining the first weight based on a first magnitude of a histogram of gradient for the first set of intra prediction predictors; and determining the second weight based on the intra prediction process comprises determining the second weight based on a second magnitude of a histogram of gradient for the second set of intra prediction predictors.

Clause 6B: The method of clause 1B, wherein: the set of reference lines comprises a first line of samples and a second line of samples that is different than the first line of samples; determining the first set of intra prediction predictors based on the set of reference lines comprises applying a first set of weights to the first line of samples and the second line of samples; and determining the second set of intra prediction predictors based on the second set of samples from the set of reference lines comprises applying a second set of weights to the first line of samples and the second line of samples.

Clause 7B: The method of clause 6B, wherein: applying the first set of weights to the first set of samples and the second set of samples comprises applying a weighting of zero to the first set of samples; and applying the second set of weights to the first set of samples and the second set of samples comprises applying the weighting of zero to the second set of samples.

Clause 8B: The method of clause 1B, further comprising: determining a third set of intra prediction predictors using a planar mode; and generating the fusion of predictors from the first set of intra prediction predictors, the second set of intra prediction predictors, and the third set of intra prediction predictors.

Clause 9B: The method of clause 8B, further comprising: determining a first weight based on the intra prediction process; determining a second weight based on the intra prediction process; setting a third weight equal to one-third; and wherein generating the fusion of predictors from the first set of intra prediction predictors and the second set of intra prediction predictors comprises applying the first weight to the first set of intra prediction predictors, the second weight to the second set of intra prediction predictors, and the third weight to the third set of intra prediction predictors to combine the first set of intra prediction predictors, the second set of intra prediction predictors, and the third set of intra prediction predictors.

Clause 10B: The method of clause 1B, further comprising: determining that a second block of the video data is encoded in a spatial geometry partition mode (SGPM); and in response to determining that the second block is encoded in the SGPM, determining that intra prediction fusion is disabled for the second block.

Clause 11B: The method of clause 1B, wherein the method is performed as part of a video encoding process.

Clause 12B: A device for decoding video data, the device comprising: a memory configured to store video data; one or more processors implemented in circuitry and configured to: determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; generate a fusion of predictors from the first set of intra prediction predictors and the second set of intra prediction predictors; and decode the block of video data using the fusion of predictors.

Clause 13B: The device of clause 12B, wherein the one or more processors are further configured to: determine a first weight based on the intra prediction process; determine a second weight based on the intra prediction process; and wherein to generate the fusion of predictors from the first set of intra prediction predictors and the second set of intra prediction predictors, the one or more processors are further configured to apply the first weight to the first set of intra prediction predictors and the second weight to the second set of intra prediction predictors to combine the first set of intra prediction predictors and the second set of intra prediction predictors.

Clause 14B: The device of clause 13B, wherein the intra prediction process comprises a template-based intra mode derivation process, and wherein the one or more processors are further configured to: determine the first weight based on the intra prediction process, the one or more processors are further configured to determine the first weight based on a first template matching cost for the first set of intra prediction predictors; and determine the second weight based on the intra prediction process, the one or more processors are further configured to determine the second weight based on a second template matching cost for the second set of intra prediction predictors.

Clause 15B: The device of clause 14B, wherein the one or more processors are further configured to: determine the first set of intra prediction predictors based on the set of reference lines, the one or more processors are further configured to determine the first set of intra prediction predictors based on a first line of the set of reference lines; and determine a second set of intra prediction predictors based on the set of reference lines, the one or more processors are further configured to determine the second set of intra prediction predictors based on a second line of the set of reference lines that is different than the first line.

Clause 16B: The device of clause 13B, wherein the intra prediction process comprises a decoder-side intra mode derivation process and wherein the one or more processors are further configured to: determine the first weight based on the intra prediction process, the one or more processors are further configured to determine the first weight based on a first magnitude of a histogram of gradient for the first set of intra prediction predictors; and determine the second weight based on the intra prediction process, the one or more processors are further configured to determine the second weight based on a second magnitude of a histogram of gradient for the second set of intra prediction predictors.

Clause 17B: The device of clause 12B, wherein the set of reference lines comprises a first line of samples and a second line of samples that is different than the first line of samples and wherein the one or more processors are further configured to: determine the first set of intra prediction predictors based on the set of reference lines, the one or more processors are further configured to apply a first set of weights to the first line of samples and the second line of samples; and determine the second set of intra prediction predictors based on the second set of samples from the set of reference lines, the one or more processors are further configured to apply a second set of weights to the first line of samples and the second line of samples.

Clause 18B: The device of clause 17B, wherein the one or more processors are further configured to: apply the first set of weights to the first set of samples and the second set of samples, the one or more processors are further configured to apply a weighting of zero to the first set of samples; and apply the second set of weights to the first set of samples and the second set of samples, the one or more processors are further configured to apply the weighting of zero to the second set of samples.

Clause 19B: The device of clause 12B, wherein the one or more processors are further configured to: determine a third set of intra prediction predictors using a planar mode; and generate the fusion of predictors from the first set of intra prediction predictors, the second set of intra prediction predictors, and the third set of intra prediction predictors.

Clause 20B: The device of clause 19B, wherein the one or more processors are further configured to: determine a first weight based on the intra prediction process; determine a second weight based on the intra prediction process; and set a third weight equal to one-third; and wherein to generate the fusion of predictors from the first set of intra prediction predictors and the second set of intra prediction predictors, the one or more processors are further configured to apply the first weight to the first set of intra prediction predictors, the second weight to the second set of intra prediction predictors, and the third weight to the third set of intra prediction predictors to combine the first set of intra prediction predictors, the second set of intra prediction predictors, and the third set of intra prediction predictors.

Clause 21B: The device of clause 12B, wherein the one or more processors are further configured to: determine that a second block of the video data is encoded in a spatial geometry partition mode (SGPM); and in response to determining that the second block is encoded in the SGPM, determine that intra prediction fusion is disabled for the second block.

Clause 22B: The device of clause 12B, wherein the device comprises a wireless communication device, further comprising a receiver configured to receive encoded video data.

Clause 23B: The device of clause 22B, wherein the wireless communication device comprises a telephone handset and wherein the receiver is configured to demodulate, according to a wireless communication standard, a signal comprising the encoded video data.

Clause 24B: The device of clause 12B, further comprising: a display configured to display decoded video data.

Clause 25B: The device of clause 12B, wherein the device comprises one or more of a camera, a computer, a mobile device, a broadcast receiver device, or a set-top box.

Clause 26B: The device of clause 12B, wherein the one or more processors comprise a video encoder.

Clause 27B: A computer-readable storage medium storing instructions that when executed by one or more processors cause the one or more processors to: determine that a block of video data is encoded using an intra prediction process that utilizes multiple intra prediction predictors; determine a set of reference lines for the intra prediction process; determine a first set of intra prediction predictors based on the set of reference lines; determine a second set of intra prediction predictors based on the set of reference lines; generate a fusion of predictors from the first set of intra prediction predictors and the second set of intra prediction predictors; and decode the block of video data using the fusion of predictors.

Clause 28B: The computer-readable storage medium of clause 27B, storing further instructions that when executed by one or more processors cause the one or more processors to: determine a first weight based on the intra prediction process; determine a second weight based on the intra prediction process; and wherein to generate the fusion of predictors from the first set of intra prediction predictors and the second set of intra prediction predictors, the one or more processors are further configured to apply the first weight to the first set of intra prediction predictors and the second weight to the second set of intra prediction predictors to combine the first set of intra prediction predictors and the second set of intra prediction predictors.

Clause 29B: The computer-readable storage medium of clause 28B, wherein the intra prediction process comprises a template-based intra mode derivation process, and storing further instructions that when executed by one or more processors cause the one or more processors to: determine the first weight based on the intra prediction process, the one or more processors are further configured to determine the first weight based on a first template matching cost for the first set of intra prediction predictors; and determine the second weight based on the intra prediction process, the one or more processors are further configured to determine the second weight based on a second template matching cost for the second set of intra prediction predictors.

Clause 30B: The computer-readable storage medium of clause 28B, wherein the intra prediction process comprises a decoder-side intra mode derivation process and storing further instructions that when executed by one or more processors cause the one or more processors to: determine the first weight based on the intra prediction process, the one or more processors are further configured to determine the first weight based on a first magnitude of a histogram of gradient for the first set of intra prediction predictors; and determine the second weight based on the intra prediction process, the one or more processors are further configured to determine the second weight based on a second magnitude of a histogram of gradient for the second set of intra prediction predictors.

Clause 31B: The computer-readable storage medium of clause 27B, wherein the set of reference lines comprises a first line of samples and a second line of samples that is different than the first line of samples and storing further instructions that when executed by one or more processors cause the one or more processors to: determine the first set of intra prediction predictors based on the set of reference lines, the one or more processors are further configured to apply a first set of weights to the first line of samples and the second line of samples; and determine the second set of intra prediction predictors based on the second set of samples from the set of reference lines, the one or more processors are further configured to apply a second set of weights to the first line of samples and the second line of samples.

Clause 32B: The computer-readable storage medium of clause 31B, storing further instructions that when executed by one or more processors cause the one or more processors to: apply the first set of weights to the first set of samples and the second set of samples, the one or more processors are further configured to apply a weighting of zero to the first set of samples; and apply the second set of weights to the first set of samples and the second set of samples, the one or more processors are further configured to apply the weighting of zero to the second set of samples.

Clause 33B: The computer-readable storage medium of clause 27B, storing further instructions that when executed by one or more processors cause the one or more processors to: determine a third set of intra prediction predictors using a planar mode; and generate the fusion of predictors from the first set of intra prediction predictors, the second set of intra prediction predictors, and the third set of intra prediction predictors.

Clause 34B: The computer-readable storage medium of clause 33B, storing further instructions that when executed by one or more processors cause the one or more processors to: determine a first weight based on the intra prediction process; determine a second weight based on the intra prediction process; and set a third weight equal to one-third; and wherein to generate the fusion of predictors from the first set of intra prediction predictors and the second set of intra prediction predictors, the one or more processors are further configured to apply the first weight to the first set of intra prediction predictors, the second weight to the second set of intra prediction predictors, and the third weight to the third set of intra prediction predictors to combine the first set of intra prediction predictors, the second set of intra prediction predictors, and the third set of intra prediction predictors.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a block of video data is encoded using an intra prediction process that utilizes multiple intra prediction predictors;
   determining a set of reference lines for the intra prediction process, the set of reference lines comprising a first line of samples and a second line of samples that is different than the first line of samples;
   applying a first set of weights to the first line of samples and to the second line of samples to determine a first set of intra prediction predictors;
   applying a second set of weights to the first line of samples and to the second line of samples to determine a second set of intra prediction predictors;
   generating a fusion of predictors from the first set of intra prediction predictors and the second set of intra prediction predictors; and
   decoding the block of video data using the fusion of predictors.

2. The method of claim 1, further comprising:
   determining the first set of weights based on the intra prediction process;
   determining the second set of weights based on the intra prediction process.

3. The method of claim 2, wherein:
   the intra prediction process comprises a template-based intra mode derivation process;
   determining the first set of weights based on the intra prediction process comprises determining the first set of weights based on a first template matching cost for the first set of intra prediction predictors; and
   determining the second set of weights based on the intra prediction process comprises determining the second set of weights based on a second template matching cost for the second set of intra prediction predictors.

4. The method of claim 3, wherein the first set of weights and the second set of weights are different.

5. The method of claim 2, wherein:
   the intra prediction process comprises a decoder-side intra mode derivation process;
   determining the first set of weights based on the intra prediction process comprises determining the first set of weights based on a first magnitude of a histogram of gradient for the first set of intra prediction predictors; and
   determining the second set of weights based on the intra prediction process comprises determining the second set of weights based on a second magnitude of a histogram of gradient for the second set of intra prediction predictors.

6. The method of claim 1, wherein the first set of weights is associated with a first intra prediction mode and the second set of weights is associated with a second intra prediction mode, the first intra prediction mode and the second intra prediction mode being different.

7. The method of claim 6, wherein:

applying the first set of weights to the first line of samples and to the second line of samples comprises applying a weighting of zero to the first line of samples; and applying the second set of weights to the first line of samples and to the second line of samples comprises applying the weighting of zero to the second line of samples, wherein the first set of weights and the second set of weights are different.

8. The method of claim 1, further comprising:

determining a third set of intra prediction predictors using a planar mode; and generating the fusion of predictors from the first set of intra prediction predictors, the second set of intra prediction predictors, and the third set of intra prediction predictors.

9. The method of claim 8, further comprising:

determining the first set of weights based on the intra prediction process;

determining the second set of weights based on the intra prediction process;

setting a third weight equal to one-third; and wherein generating the fusion of predictors from the first set of intra prediction predictors, the second set of intra prediction predictors, and the third set of intra prediction predictors comprises applying the third weight to the third set of intra prediction predictors to combine the first set of intra prediction predictors, the second set of intra prediction predictors, and the third set of intra prediction predictors.

10. The method of claim 1, further comprising:

determining that a second block of the video data is encoded in a spatial geometry partition mode (SGPM); and in response to determining that the second block is encoded in the SGPM, determining that intra prediction fusion is disabled for the second block.

11. The method of claim 1, wherein the method is performed as part of a video encoding process.

12. A device for decoding video data, the device comprising:

a memory configured to store video data;

one or more processors implemented in circuitry and configured to:

determine that a block of video data is encoded using an intra prediction process that utilizes multiple intra prediction predictors;

determine a set of reference lines for the intra prediction process, the set of reference lines comprising a first line of samples and a second line of samples that is different than the first line of samples;

apply a first set of weights to the first line of samples and to the second line of samples to determine a first set of intra prediction predictors;

apply a second set of weights to the first line of samples and to the second line of samples to determine a second set of intra prediction predictors;

generate a fusion of predictors from the first set of intra prediction predictors and the second set of intra prediction predictors; and decode the block of video data using the fusion of predictors.

13. The device of claim 12, wherein the one or more processors are further configured to:

determine the first set of weights based on the intra prediction process;

determine the second set of weights based on the intra prediction process.

14. The device of claim 13, wherein the intra prediction process comprises a template-based intra mode derivation process, and wherein the one or more processors are further configured to:

determine the first set of weights based on the intra prediction process, the one or more processors are further configured to determine the first set of weights based on a first template matching cost for the first set of intra prediction predictors; and determine the second set of weights based on the intra prediction process, the one or more processors are further configured to determine the second set of weights based on a second template matching cost for the second set of intra prediction predictors.

15. The device of claim 14, wherein the first set of weights and the second set of weights are different.

16. The device of claim 13, wherein the intra prediction process comprises a decoder-side intra mode derivation process and wherein the one or more processors are further configured to:

determine the first set of weights based on the intra prediction process, the one or more processors are further configured to determine the first set of weights based on a first magnitude of a histogram of gradient for the first set of intra prediction predictors; and determine the second set of weights based on the intra prediction process, the one or more processors are further configured to determine the second set of weights based on a second magnitude of a histogram of gradient for the second set of intra prediction predictors.

17. The device of claim 12, wherein the first set of weights is associated with a first intra prediction mode and the second set of weights is associated with a second intra prediction mode, the first intra prediction mode and the second intra prediction mode being different.

18. The device of claim 17, wherein the one or more processors are further configured to:

apply the first set of weights to the first line of samples and to the second line of samples, the one or more processors are further configured to apply a weighting of zero to the first line of samples; and apply the second set of weights to the first line of samples and to the second line of samples, the one or more processors are further configured to apply the weighting of zero to the second line of samples, wherein the first set of weights and the second set of weights are different.

19. The device of claim 12, wherein the one or more processors are further configured to:

determine a third set of intra prediction predictors using a planar mode; and generate the fusion of predictors from the first set of intra prediction predictors, the second set of intra prediction predictors, and the third set of intra prediction predictors.

20. The device of claim 19, wherein the one or more processors are further configured to:

determine the first set of weights based on the intra prediction process;

determine the second set of weights based on the intra prediction process; and set a third weight equal to one-third; and wherein to generate the fusion of predictors from the first set of intra prediction predictors, the second set of intra prediction predictors, and the third set of intra prediction predictors, the one or more processors are further configured to apply the third weight to the third set of intra prediction predictors to combine the first set of intra prediction predictors, the second set of intra prediction predictors, and the third set of intra prediction predictors.

21. The device of claim 12, wherein the one or more processors are further configured to:

determine that a second block of the video data is encoded in a spatial geometry partition mode (SGPM); and in response to determining that the second block is encoded in the SGPM, determine that intra prediction fusion is disabled for the second block.

22. The device of claim 12, wherein the device comprises a wireless communication device, further comprising a receiver configured to receive encoded video data.

23. The device of claim 22, wherein the wireless communication device comprises a telephone handset and wherein the receiver is configured to demodulate, according to a wireless communication standard, a signal comprising the encoded video data.

24. The device of claim 12, further comprising:

a display configured to display decoded video data.

25. The device of claim 12, wherein the device comprises one or more of a camera, a computer, a mobile device, a broadcast receiver device, or a set-top box.

26. The device of claim 12, wherein the one or more processors comprise a video encoder.

27. A non-transitory, computer-readable storage medium storing instructions that when executed by one or more processors cause the one or more processors to:

determine that a block of video data is encoded using an intra prediction process that utilizes multiple intra prediction predictors;

determine a set of reference lines for the intra prediction process, the set of reference lines comprising a first line of samples and a second line of samples that is different than the first line of samples;

apply a first set of weights to the first line of samples and to the second line of samples to determine a first set of intra prediction predictors;

apply a second set of weights to the first line of samples and to the second line of samples to determine a second set of intra prediction predictors;

generate a fusion of predictors from the first set of intra prediction predictors and the second set of intra prediction predictors; and decode the block of video data using the fusion of predictors.

28. The non-transitory, computer-readable storage medium of claim 27, storing further instructions that when executed by one or more processors cause the one or more processors to:

determine the first set of weights based on the intra prediction process;

determine the second set of weights based on the intra prediction process.

29. The non-transitory, computer-readable storage medium of claim 28, wherein the intra prediction process comprises a template-based intra mode derivation process, and storing further instructions that when executed by one or more processors cause the one or more processors to:

determine the first set of weights based on the intra prediction process, the one or more processors are further configured to determine the first set of weights based on a first template matching cost for the first set of intra prediction predictors; and determine the second set of weights based on the intra prediction process, the one or more processors are further configured to determine the second set of weights based on a second template matching cost for the second set of intra prediction predictors.

30. The non-transitory, computer-readable storage medium of claim 28, wherein the first set of weights and the second set of weights are different.

31. The non-transitory, computer-readable storage medium of claim 27, wherein the first set of weights is associated with a first intra prediction mode and the second set of weights is associated with a second intra prediction mode, the first intra prediction mode and the second intra prediction mode being different.

32. The non-transitory, computer-readable storage medium of claim 31, storing further instructions that when executed by one or more processors cause the one or more processors to:

apply the first set of weights to the first line of samples and the second line of samples, the one or more processors are further configured to apply a weighting of zero to the first line of samples; and apply the second set of weights to the first line of samples and the second line of samples, the one or more processors are further configured to apply the weighting of zero to the second line of samples.

33. The non-transitory, computer-readable storage medium of claim 27, storing further instructions that when executed by one or more processors cause the one or more processors to:

determine a third set of intra prediction predictors using a planar mode; and generate the fusion of predictors from the first set of intra prediction predictors, the second set of intra prediction predictors, and the third set of intra prediction predictors.

34. The non-transitory, computer-readable storage medium of claim 33, storing further instructions that when executed by one or more processors cause the one or more processors to:

determine the first set of weights based on the intra prediction process;

determine the second set of weights based on the intra prediction process; and set a third weight equal to one-third; and wherein to generate the fusion of predictors from the first set of intra prediction predictors, the second set of intra prediction predictors, and the third set of intra prediction predictors, the non-transitory, computer-readable storage medium stores further instructions that when executed by one or more processors cause the one or more processors to apply the third weight to the third set of intra prediction predictors to combine the first set of intra prediction predictors, the second set of intra prediction predictors, and the third set of intra prediction predictors.

* * * * *